US010797561B2

(12) United States Patent
Shoda et al.

(10) Patent No.: US 10,797,561 B2
(45) Date of Patent: Oct. 6, 2020

(54) BRUSHLESS WIPER MOTOR

(71) Applicant: Mitsuba Corporation, Gunma (JP)

(72) Inventors: Hirokazu Shoda, Gunma (JP);
Yukiyoshi Iso, Gunma (JP); Osamu
Nakamura, Gunma (JP)

(73) Assignee: Mitsuba Corporation, Kiryu-shi,
Gunma (JP)

( * ) Notice: Subject to any disclaimer, the term of this
patent is extended or adjusted under 35
U.S.C. 154(b) by 432 days.

(21) Appl. No.: 15/324,282

(22) PCT Filed: Jul. 14, 2015

(86) PCT No.: PCT/JP2015/070110
§ 371 (c)(1),
(2) Date: Jan. 6, 2017

(87) PCT Pub. No.: WO2016/010021
PCT Pub. Date: Jan. 21, 2016

(65) Prior Publication Data
US 2017/0207679 A1 Jul. 20, 2017

(30) Foreign Application Priority Data

Jul. 15, 2014 (JP) ................................. 2014-145163

(51) Int. Cl.
H02K 7/11 (2006.01)
H02K 7/116 (2006.01)
(Continued)

(52) U.S. Cl.
CPC ................ H02K 7/116 (2013.01); B60S 1/08
(2013.01); H02K 7/08 (2013.01); H02K 7/081
(2013.01);
(Continued)

(58) Field of Classification Search
CPC ......... B60S 1/08; H02K 11/215; H02K 29/08;
H02K 7/08; H02K 7/081; H02K 7/116;
(Continued)

(56) References Cited

U.S. PATENT DOCUMENTS 5,994,807 A 11/1999 Coles et al.
6,194,849 B1 2/2001 Wilson-Jones et al.
(Continued)

FOREIGN PATENT DOCUMENTS

CN 1148366 A 4/1997
DE 102012105748 A1 1/2014
(Continued)

OTHER PUBLICATIONS

Supplementary European Search Report for Serial No. EP 15 82
1699 dated Feb. 23, 2018.
(Continued)

Primary Examiner — Shawki S Ismail
Assistant Examiner — Demetries A Gibson
(74) Attorney, Agent, or Firm — McCormick, Paulding &
Huber PLLC

(57) ABSTRACT

In a brushless wiper motor, a rotor (33) is rotatably provided
inside a stator (32) provided with a coil (32b), one end side
of a rotation shaft (34) in the axial direction is fixed to the
axial center of the rotor (33), a worm (35) is provided on the
other end side of the rotation shaft (34) in the axial direction,
the first and second bearings (36, 37) are respectively
provided on one end side of the rotation shaft (34) in the
axial direction and the other end side of the rotation shaft
(34) in the axial direction than the worm (35) of the rotation
shaft (34), the rotation shaft (34) is rotatably supported by
only the first and second bearings (36, 37), and with the
position of the first bearing (36) being defined as a reference
position, a length thereof in the axial direction to the second
(Continued)

bearing (37) is longer than a length thereof in the axial direction to the rotor (33). Since a commutator and other parts are not provided on a free end side of the rotation shaft (34), it is possible to provide a brushless wiper motor reduced in length of the rotation shaft (34), and reduced in inertial mass of the free end side of the rotation shaft (34).

5 Claims, 15 Drawing Sheets

(51) Int. Cl.
*B60S 1/08* (2006.01)
*H02K 29/08* (2006.01)
*H02K 7/08* (2006.01)
*H02K 11/215* (2016.01)
*H02K 5/15* (2006.01)
*H02K 5/16* (2006.01)

(52) U.S. Cl.
CPC .......... *H02K 7/1166* (2013.01); *H02K 11/215* (2016.01); *H02K 29/08* (2013.01); *H02K 5/15* (2013.01); *H02K 5/16* (2013.01)

(58) Field of Classification Search
CPC .......... H02K 7/1166; H02K 5/15; H02K 5/16; H02K 2205/03
USPC .............................................. 310/83, 90, 99
See application file for complete search history.

(56) References Cited

U.S. PATENT DOCUMENTS

| | | | |
|---|---|---|---|
| 6,211,631 B1 | 4/2001 | Wilson-Jones et al. | |
| 2003/0173843 A1 | 9/2003 | Sakai et al. | |
| 2005/0116561 A1 | 6/2005 | Matsubara et al. | |
| 2006/0226802 A1* | 10/2006 | Marentette | B60S 1/08 318/443 |
| 2007/0205680 A1* | 9/2007 | Miyoshi | H02K 29/12 310/90 |
| 2007/0235248 A1 | 10/2007 | Matsubara et al. | |
| 2009/0058208 A1* | 3/2009 | Kimura | H02K 5/1732 310/83 |
| 2009/0120225 A1* | 5/2009 | Saya | H02K 7/1166 74/421 A |
| 2009/0266640 A1 | 10/2009 | Oshima et al. | |
| 2013/0015739 A1 | 1/2013 | Kastinger et al. | |
| 2013/0213727 A1 | 8/2013 | Bieber et al. | |
| 2014/0252897 A1* | 9/2014 | Yasumoto | H02K 5/148 310/71 |
| 2015/0035398 A1* | 2/2015 | Heuberger | H01R 4/242 310/71 |
| 2015/0357881 A1* | 12/2015 | Yamaoka | H02K 7/1166 310/83 |

FOREIGN PATENT DOCUMENTS

| | | |
|---|---|---|
| EP | 0943842 A1 | 9/1999 |
| EP | 1433975 A1 | 6/2004 |
| JP | 2000-500102 A | 1/2000 |
| JP | 2005-94822 A | 4/2005 |
| JP | 2005-168099 A | 6/2005 |
| JP | 2006-311654 A | 11/2006 |
| JP | 2008-253049 A | 10/2008 |
| JP | 2011-223778 A | 11/2011 |
| JP | 2011-244562 A | 12/2011 |
| JP | 2013-538744 A | 10/2013 |
| JP | 2013207890 A | 10/2013 |
| JP | 2014083893 A | 5/2014 |
| JP | 2014087216 A | 5/2014 |
| WO | 9718120 A1 | 5/1997 |
| WO | 9810971 | 3/1998 |
| WO | 2008/117728 A1 | 10/2008 |
| WO | 2010024406 A1 | 3/2010 |
| WO | 2011079982 A2 | 7/2011 |
| WO | 2013113792 A2 | 8/2013 |

OTHER PUBLICATIONS

Supplementary European Search Report for Serial No. EP 15 82 1881 dated Feb. 26, 2018.
International Search Report for PCT Serial No. PCT/JP2015/070110 dated Sep. 18, 2015.
Supplementary European Search Report for Serial No. EP 15 82 2886 dated Feb. 13, 2018.
Communication for European Patent Application No. 15 822 886.6 dated Jun. 4, 2020.

* cited by examiner (a)

(b)

BRUSHLESS WIPER MOTOR

CROSS-REFERENCE TO RELATED APPLICATION

Applicant hereby claims foreign priority benefits under U.S.C. § 119 from International Patent Application Serial No. PCT/JP2015/070110 filed on Jul. 14, 2015 and Japanese Patent Application No. 2014-145163 filed Jul. 15, 2014, the contents of all of which are incorporated by reference herein.

TECHNICAL FIELD

The present invention relates to a brushless wiper motor which swings a wiper member provided on a windshield.

BACKGROUND ART

Conventionally, a wiper apparatus for wiping rain water, dust and the like on a windshield is mounted on a vehicle such as automotive vehicle. The wiper apparatus is provided with: a wiper member provided on a windshield; and a wiper motor for swinging the wiper member. By ON-operation of a wiper switch provided within a vehicle compartment, the wiper motor is rotated so that the wiper member is swung on the windshield. Since the wiper motor is provided in a small mounting space closed by a cowl top panel or the like, it is possible to adopt a motor with reduction mechanism which can obtain large output while being small in size.

For example, Japanese Patent application Laid-Open Publication No.: 2006-311654 (FIG. 1) discloses a motor with reduction mechanism mounted on a vehicle. An electric actuator (i.e., motor with reduction mechanism) described in Japanese Patent application Laid-Open Publication No.: 2006-311654 (FIG. 1) is provided with: a motor main body provided with a rotor having a coil and a brush unit; and a reduction mechanism having a worm wheel. The reduction mechanism is provided with a gear case, and the gear case is provided with first and second ball bearings supporting a motor shaft, thereby putting a worm portion side of the motor shaft in a cantilever state. Therefore, the whole electric actuator is reduced in size and weight.

SUMMARY

In addition, since wiper motors are mounted on a wide variety of vehicles including a kei car (small-sized vehicle) and a large-sized vehicle. Therefore, it is necessary to further reduce its size and weight to enhance versatility. Furthermore, in recent vehicles or the like, various control devices are provided inside its instrument panel or the like positioned close to the wiper motor. Therefore, it is necessary to suppress electric noises during operation to a maximum extent, and to prevent the control devices from malfunctioning.

However, according to the electric actuator described in the above Japanese Patent application Laid-Open Publication No.: 2006-311654 (FIG. 1), its size and weight reductions are achieved by putting the rotor side of the motor shaft in a non-supported state, but parts which are relatively heavy in weight, such as iron core, coil, and commutator, are arranged in a non-supported portion of the motor shaft, that is, a free end portion of the motor shaft. Therefore, the free end portion of the motor shaft has a relatively-large inertial mass, so that large driving current is required for rotating the motor shaft, and rotation fluctuation occurs at the free end portion of the motor shaft unless the coil is wound precisely. Furthermore, since the wiper motor has a brush unit, electric noise countermeasure is required for electric noises, and its size and weight reductions may be reaching their limits.

An object of the present invention is to provide a brushless wiper motor improved in size and weight while suppressing electric noises, and enabling stable operation with low electric power.

According to one aspect of the present invention, there is provided a brushless wiper motor swinging a wiper member comprising:

a stator provided with a coil; a rotor rotatably provided inside the stator; a rotation shaft having one end side in an axial direction thereof, fixed to an axial center of the rotor; a worm provided on the other end side of the rotation shaft in the axial direction; a casing in which the worm is housed, the casing having a gear case formed with an opening in an axial direction of the rotation shaft, and a cover member closing the opening; first and second bearing attaching portions provided on the gear case, and a stator fixing portion axially aligned with the first and second bearing attaching portions; a first bearing provided on one end side in the axial direction than the worm of the rotation shaft, and provided on the first bearing attaching portion and a second bearing provided on the other end side in the axial direction than the worm of the rotation shaft, and provided on the second bearing attaching portion, wherein the stator fixing portion, the first bearing attaching portion, and the second bearing attaching portion are axially aligned with each other, the rotation shaft is supported by only the first bearing and the second bearing, and based on a position of the first bearing, a length thereof in the axial direction up to the second bearing is longer than a length thereof in the axial direction up to the rotor.

In another aspect of the present invention, the first bearing is constituted as a ball bearing provided with: an outer wheel; an inner wheel; and steel balls, the outer wheel being fixed to the first bearing attaching portion, the inner wheel being fixed to the rotation shaft.

In another aspect of the present invention, an outer diameter of the second bearing is smaller than an inner diameter of a through-hole of the first bearing attaching portion, and the second bearing passes through the first bearing attaching portion at the time of assembling the brushless wiper motor.

In another aspect of the present invention, a clearance allowing movement of the rotation shaft in a diametrical direction of the rotation shaft is formed in at least one of between the second bearing and the second bearing attaching portion and between the second bearing and the rotation shaft.

In another aspect of the present invention, the casing is provided with a retaining mechanism for retaining the first bearing at a predetermined position in the casing.

In another aspect of the present invention, a sensor member used to detect a rotation state of the rotation shaft is provided between the first bearing and the second bearing of the rotation shaft.

In another aspect of the present invention, the casing is provided with a control board for controlling at least one of the rotor and the rotation shaft, and the control board is provided with a detecting member used to detect a rotation state of the rotation shaft, and disposed so as to face the sensor member.

According to the present invention, since the rotor is rotatably provided inside the stator provided with a coil, one end side of the rotation shaft in the axial direction is fixed to the axial center of the rotor, the worm is provided on the other end side of the rotation shaft in the axial direction, the first and second bearings are respectively provided on one end side of the rotation shaft in the axial direction and the other end side of the rotation shaft in the axial direction than the worm of the rotation shaft, the rotation shaft is rotatably supported by only the first and second bearings, and based on the position of the first bearing, the length thereof in the axial direction to the second bearing is longer than the length thereof in the axial direction to the rotor.

Therefore, since it is unnecessary to provide a coil, a commutator or the like at the free end portion of the rotation shaft which is not supported at all, while the rotation shaft is shortened as compared with the conventional one, an inertial mass of the free end portion of the rotation shaft can be made small. Therefore, the rotation shaft can be caused to act stably as compared with the conventional one, and improvement in silence can be achieved. Furthermore, since the commutator and the brush are not provided, occurrence of electric noises is suppressed, so that while adverse effect to the control devices is removed, brush replacement is made unnecessary to achieve maintenance free.

DETAILED DESCRIPTION

Hereinafter, the first embodiment of the present invention will be described with reference to the accompanying drawings.

Figure 1:
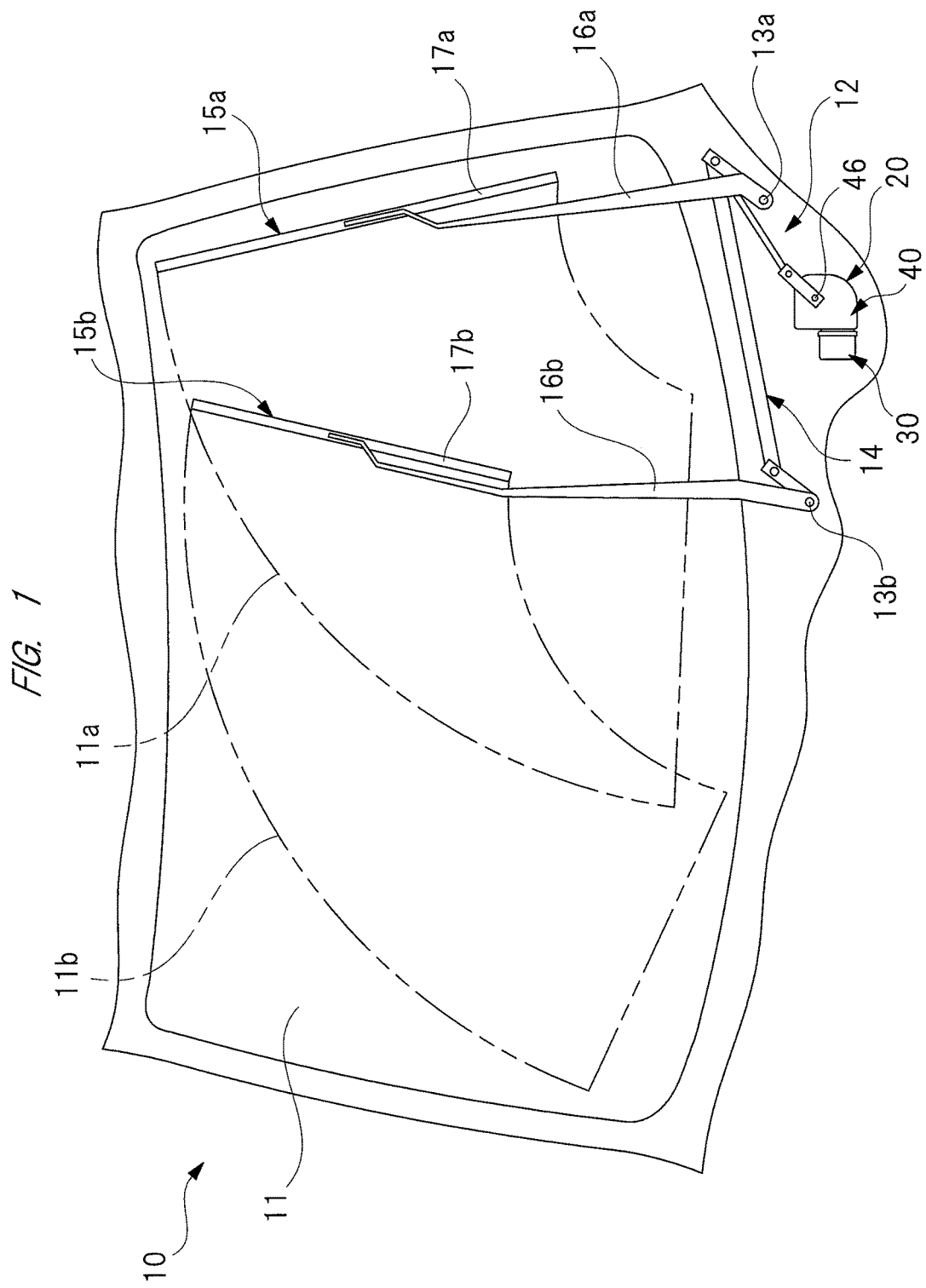
FIG. 1 is a view showing a wiper apparatus mounted on a vehicle, and provided with a brushless wiper motor according to the present invention.
Figure 2:
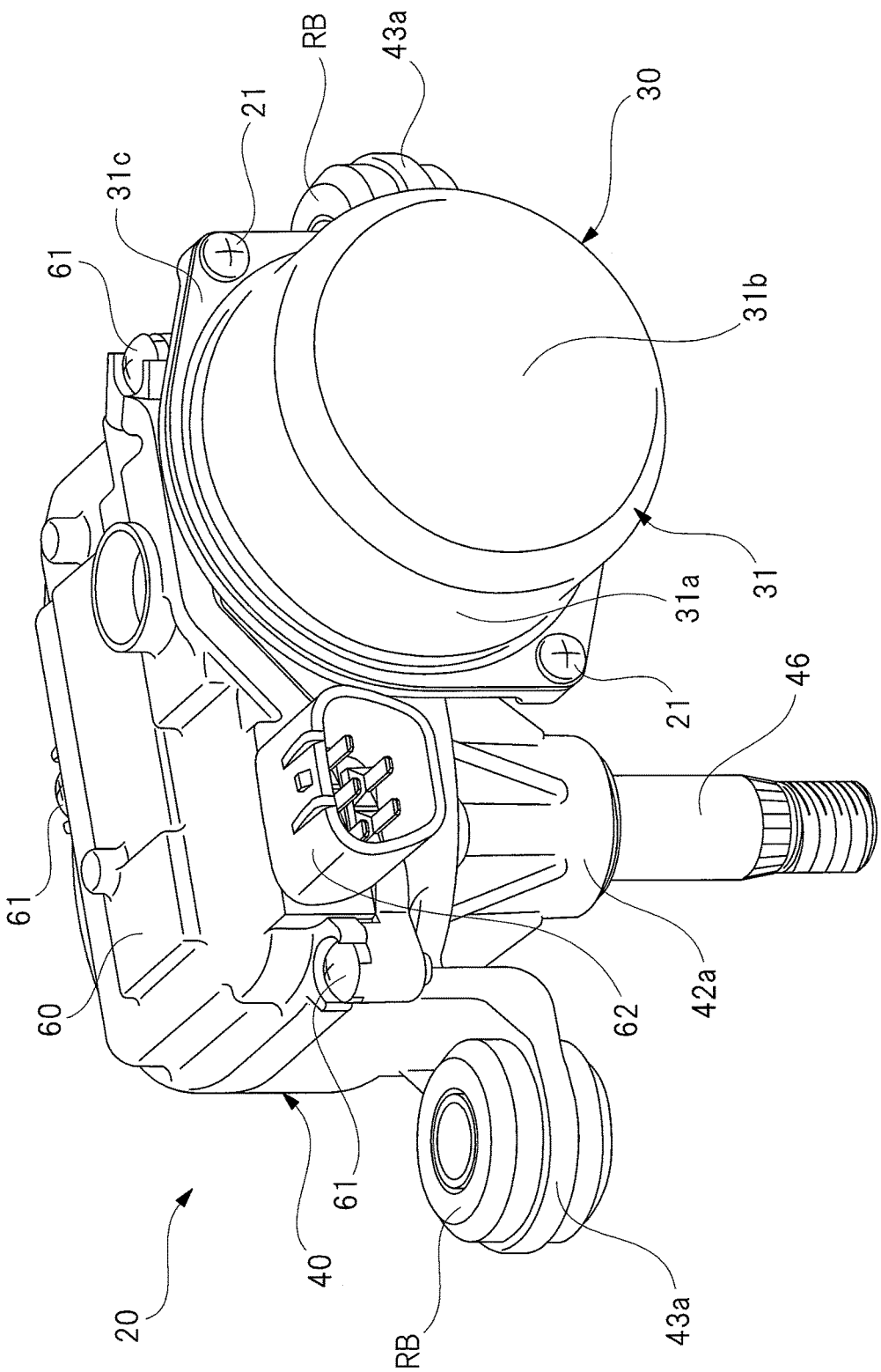
FIG. 2 is a perspective view of the brushless wiper motor, viewed from a motor unit.
Figure 3:
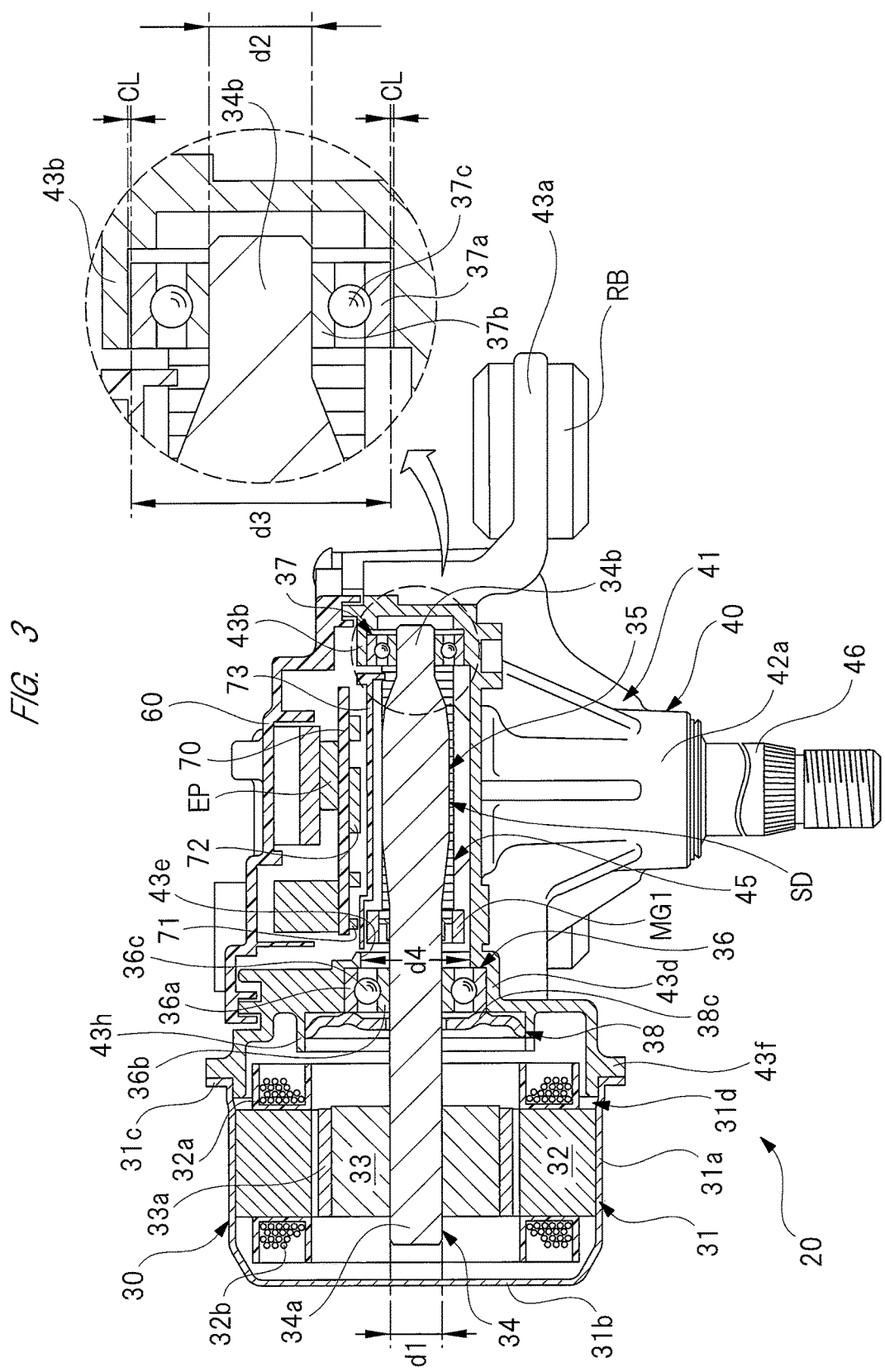
FIG. 3 is a sectional view explaining an internal structure of the brushless wiper motor.
Figure 4:
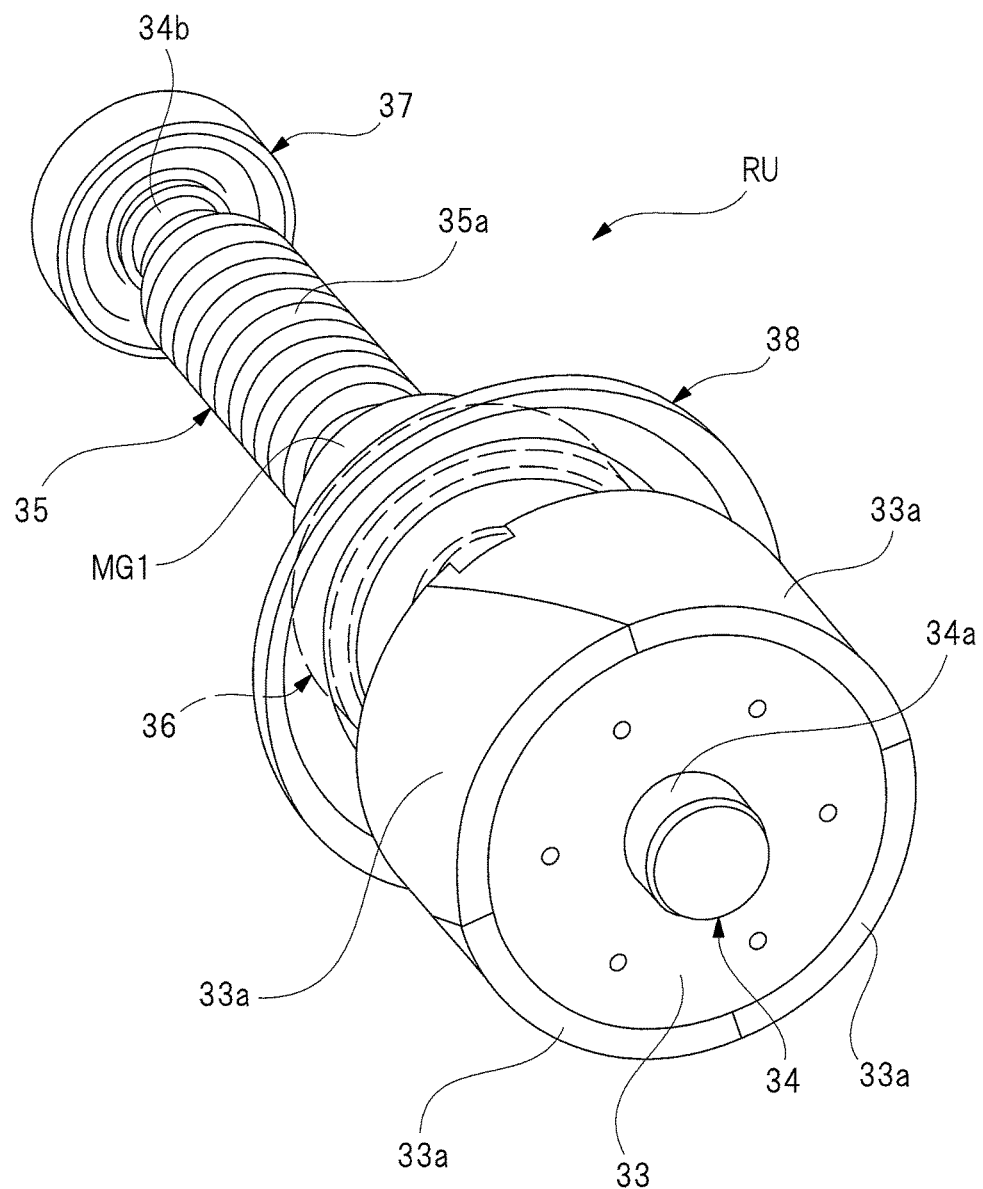
FIG. 4 is a perspective view showing a rotor unit.
Figure 6:
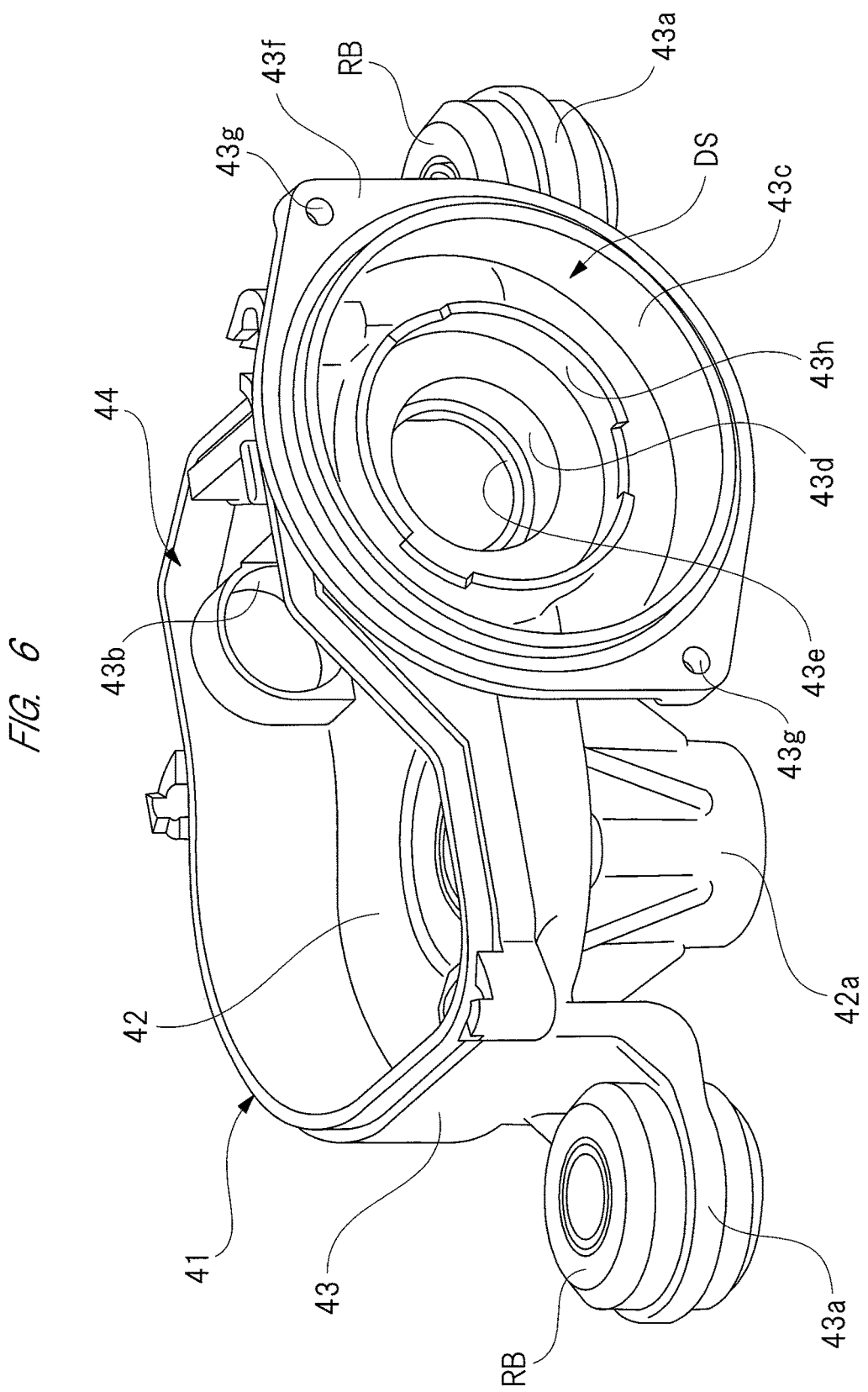
FIG. 6 is a perspective view explaining a detailed structure of a gear case.
Figure 7:
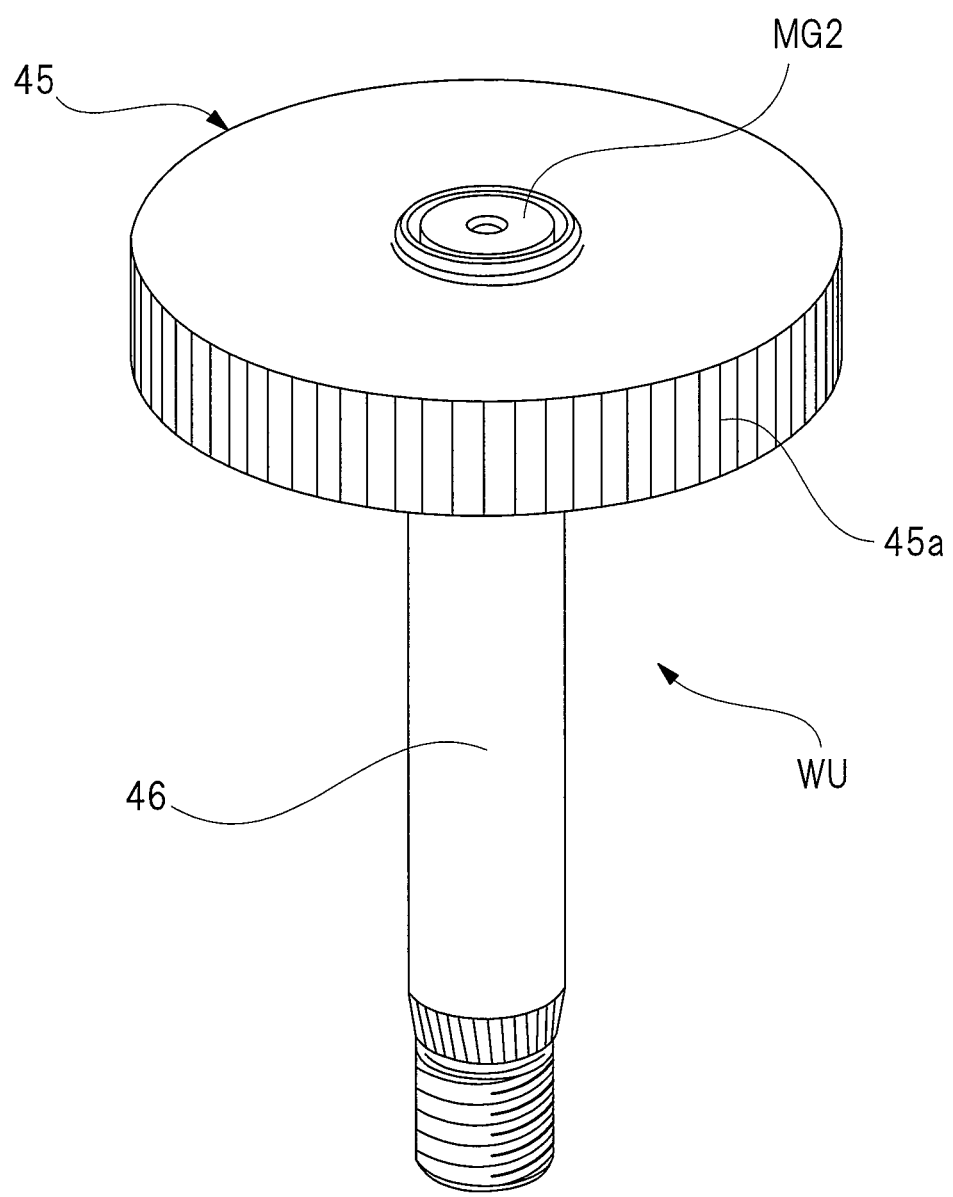
FIG. 7 is a perspective view showing a worm wheel unit.
Figure 8:
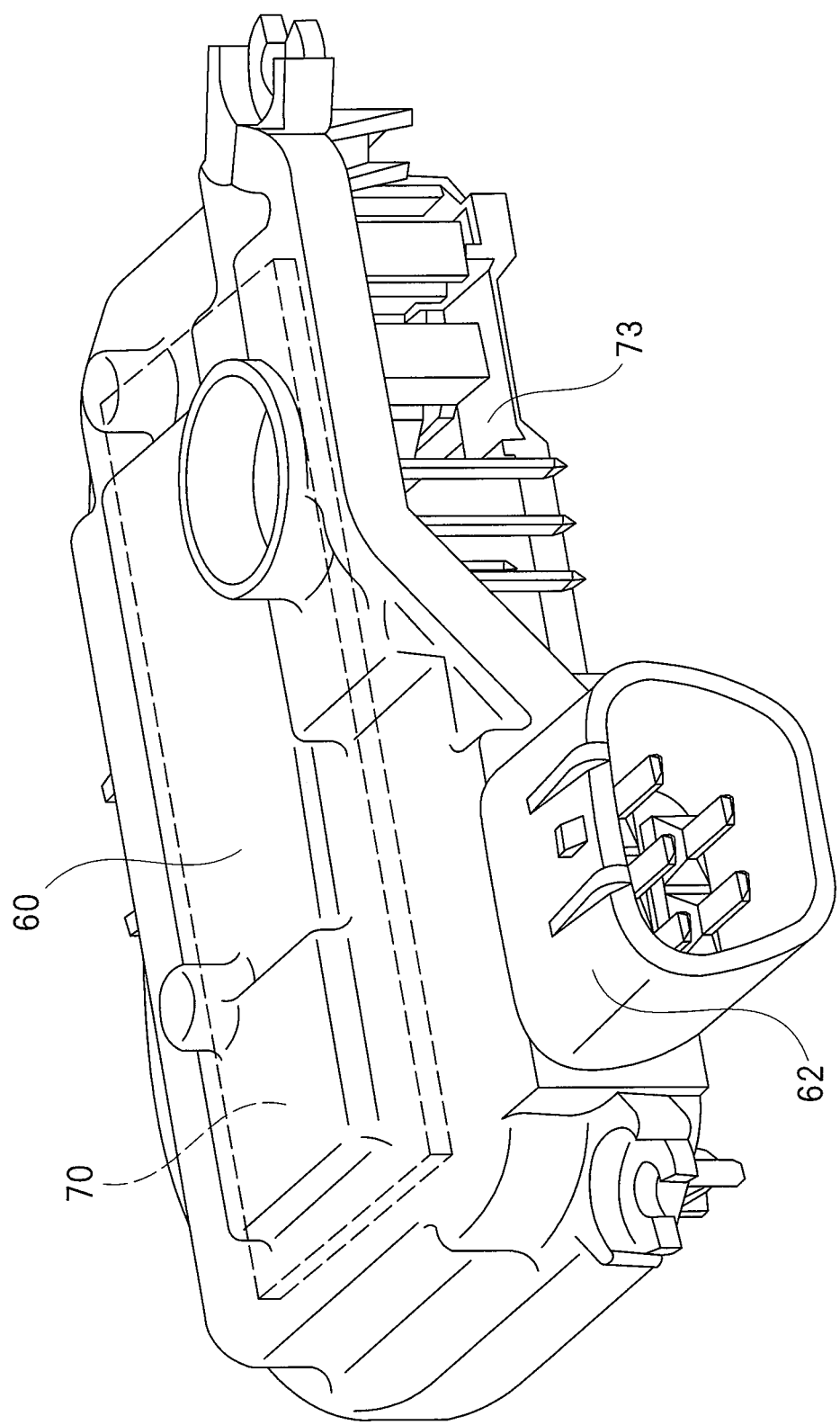
FIG. 8 is a perspective view explaining a detailed structure of a gear cover.

FIG. 1 is a view showing a wiper apparatus mounted on a vehicle, and provided with a brushless wiper motor according to the present invention; FIG. 2 is a perspective view of the brushless wiper motor, viewed from a motor unit; FIG. 3 is a sectional view explaining an internal structure of the brushless wiper motor; FIG. 4 is a perspective view showing a rotor unit; FIG. 5A is a perspective view of a stopper spring; FIG. 5B is a sectional view of the stopper spring; FIG. 6 is a perspective view explaining a detailed structure of a gear case; FIG. 7 is a perspective view showing a worm wheel unit; and FIG. 8 is a perspective view explaining a detailed structure of a gear cover.

As shown in FIG. 1, a front windshield 11 is provided on a vehicle 10 such as automotive vehicle. A wiper apparatus 12 is mounted on a front end portion of the front windshield 11 in the vehicle 10. The wiper apparatus 12 is driven by ON-operation of a wiper switch (not shown) provided within a vehicle compartment, so that extraneous matter (not shown) such as rain water or dust on the front windshield 11 can be wiped.

The wiper apparatus 12 is provided with: a brushless wiper motor 20; a power transmission mechanism 14 for transmitting swinging motion of the brushless wiper motor 20 to respective pivot shafts 13a and 13b; and a pair of wiper members 15a and 15b in which proximal sides thereof are respectively fixed to the pivot shafts 13a and 13b, and distal end sides thereof perform reciprocal wiping actions on the front windshield 11 according to swinging motions of the respective pivot shafts 13a and 13b.

The wiper members 15a and 15b are respectively provided so as to correspond to a driver's seat side and a passenger's seat side. The wiper members 15a and 15b are respectively composed of wiper arms 16a and 16b, and wiper blades 17a and 17b attached to the wiper arms 16a and 16b.

By rotationally driving the brushless wiper motor 20, a swinging motion of the brushless wiper motor 20 is transmitted to the respective pivot shafts 13a and 13b by the power transmission mechanism 14. In this manner, the pivot shafts 13a and 13b are respectively driven in a swinging manner. Thus, a driving force of the brushless wiper motor 20 is transmitted to the respective wiper members 15a and 15b, so that extraneous matters attached within respective wiping ranges 11a and 11b of the front windshield 11 are wiped by the respective wiper blades 17a and 17b.

As shown in FIGS. 2 and 3, the brushless wiper motor 20 is provided with a motor unit 30 and a gear unit 40. The motor unit 30 and the gear unit 40 are coupled to each other via a pair of fixing screws 21. Here, a sealing member (not shown) such as an O-ring is provided between the motor unit 30 and the gear unit 40, so that rain water or the like is prevented from entering interior of the brushless wiper motor 20.

The motor unit 30 is provided with a motor case 31 formed into a bottomed cylindrical shape by performing a deep drawing (pressing) or the like to a steel plate. The motor case 31 has a cylindrical main body 31a, a bottom portion 31b on one end side of the cylindrical main body 31a in an axial direction thereof, and a flange portion 31c on the other end side of the cylindrical main body 31a in the axial direction.

The bottom portion 31b is formed into an approximately circular plate shape, and it closes to one end side of the cylindrical main body 31a in the axial direction. The flange portion 31c is formed by folding one portion of the other end side of the cylindrical main body 31a in the axial direction outside in a diametrical direction, and an opening portion 31d is formed inside of the flange portion 31c in the diametrical direction. The flange portion 31c is caused to abut on a flange portion 43f of the gear case 41, the flange portion 31c is configured such that a pair of fixing screws 21 coupling the motor unit 30 and the gear unit 40 with each other extends so as to penetrate through the flange portion 31*c*.

A stator 32 is fixed inside the cylindrical main body 31*a* forming the motor case 31 in the diametrical direction. The stator 32 is formed into an approximately circular shape by stacking a plurality of steel plates (not shown) made of magnetic material, and an outer peripheral portion of the stator 32 is firmly fixed to the cylindrical main body 31*a* by a bonding agent (not shown) or the like.

Coil bobbins 32*a* made of resin is an insulator, and respectively provided on both sides of the stator 32 in the axial direction. The coil bobbin 32*a* has U-phase, V-phase and W-phase coils 32*b* (three-phase) wounded thereon. End portions (not shown) of these coils 32*b* are electrically connected to each other so as to constitute a star connection ("Y"-connection). However, a connecting method of each coil 32*b* is not limited to the star connection, but another connecting method such as delta connection (triangular connection) can be adopted.

Driving currents are respectively supplied to the respective coils 32*b* from an electronic part EP composed of switching elements of a control board 70 attached inside the gear cover 60 at a predetermined timing. Therefore, an electromagnetic force is generated in the stator 32, so that the rotor 33 positioned inside the stator 32 is rotationally driven in a predetermined direction with a predetermined driving torque.

A rotor 33 is rotatably provided inside the stator 32 via a predetermined clearance (airgap). The rotor 33 is formed into an approximately cylindrical shape by stacking a plurality of steel plates (not shown) made of magnetic material. A plurality of (four) permanent magnets 33*a* having a transverse sectional shape formed into an arc shape are attached to an outer surface of the rotor 33 in the diametrical direction, as shown in FIG. 4.

The permanent magnets 33*a* are arranged at equal intervals (at intervals of 90°) such that polarities are alternated along a circumferential direction of the rotor 33. Thus, the brushless wiper motor 20 constitutes a brushless motor having an SPM (surface permanent magnet) structure in which the permanent magnets 33*a* are attached to the surface of the rotor 33. However, the present invention is not limited to the brushless motor having an SPM structure but a brushless motor having an IPM (interior permanent magnet) structure in which permanent magnets are embedded in the rotor 33 may be adopted.

As shown in FIGS. 3 and 4, one end side (left side in FIG. 3) of the rotation shaft 34 in the axial direction is fixed to an axial center of the rotor 33. A worm 35 provided with a spiral teeth portion 35*a* formed by a rolling work or the like is integrally provided on the other end side (right side in FIG. 3) of the rotation shaft 34 in the axial direction. Here, one end side of the rotation shaft 34 in the axial direction than the worm 35 is constituted as a large diameter portion 34*a* with a diameter of d1, and the other end side of the rotation shaft 34 in the axial direction than the worm 35 is constituted as a small diameter portion 34*b* with a diameter of d2 (d1>d2).

A first ball bearing 36 as a first bearing is provided to a portion of the large diameter portion 34*a* close to the worm 35. The first ball bearing 36 is formed of an outer wheel 36*a* and an inner wheel 36*b* which are made of steel material, and a plurality of steel balls 36*c* provided between the outer wheel 36*a* and the inner wheel 36*b*. The inner wheel 36*b* is fixed to the large diameter portion 34*a* by fixing means (not shown) such as retaining ring or caulking, and the outer wheel 36*a* is provided inside a first bearing attaching portion 43*d* of the gear case 41.

Here, the first ball bearing 36 is pressed to the first bearing attaching portion 43*d* by an annular stopper ring 38 (see FIG. 5) to be fixed thereto. Furthermore, the stopper ring 38 is press-fitted into a spring receiving portion 43*h* of the gear case 41 to be fixed thereto.

By fixing the first ball bearing 36 to the first bearing attaching portion 43*d* in this manner, the rotation shaft 34 is made immovable in the axial direction. Therefore, the rotation shaft 34 is prevented from wobbling in the axial direction inside the motor case 31 and the gear case 41, which results in smooth rotation of the rotation shaft 34.

Incidentally, the first bearing attaching portion 43*d* and the spring receiving portion 43*h* in the gear case 41 and the stopper spring 38 press-fitted into the spring receiving portion 43*h* constitute a retaining mechanism in the present invention. That is, the first bearing attaching portion 43*d*, the spring receiving portion 43*h*, and the stopper spring 38 collectively retain the first ball bearing 36 at a predetermined position (position of the first bearing attaching portion 43*d*) in the gear case 41.

The small diameter portion 34*b* is provided with a second ball bearing 37 as a second bearing. The second ball bearing 37 is formed of: an outer wheel 37*a* and an inner wheel 37*b*, which are made of steel material; and a plurality of steel balls 37*c* disposed between the outer wheel 37*a* and the inner wheel 37*b* like the first ball bearing 36. The inner wheel 37*b* is fixed to the small diameter portion 34*b* by press-fitting or the like, and the outer wheel 37*a* is provided in a second bearing attaching portion 43*b* of the gear case 41 through a predetermined clearance (gap) CL.

Here, on the basis of a position of the first ball bearing 36 fixed to the rotation shaft 34 along the axial direction thereof, a length L1 (see FIG. 1) from the first ball bearing 36 to the second ball bearing 37 is set to be longer than a length L2 (see FIG. 10) from the first ball bearing 36 to the rotor 33 (L1>L2).

Furthermore, the second ball bearing 37 is constituted as a ball bearing smaller in size than the first ball bearing 36, and an outer diameter d3 of the second ball bearing 37 is made smaller than an inner diameter d4 of a through-hole 43*e* of the first bearing attaching portion 43*d* (d3<d4). Therefore, at the time of assembling the brushless wiper motor 20, the second ball bearing 37 fixed to the small diameter portion 34*b* extends so as to penetrate the through-hole 43*e* of the first bearing attaching portion 43*d* from the left side in FIG. 3 so that the second ball bearing 37 can be easily arranged in the second bearing attaching portion 43*b*.

In addition, a clearance CL is provided between the second ball bearing 37 and the second bearing attaching portion 43*b*. Therefore, when the wiping actions are performed with a large load applied to the brushless wiper motor 20 (at an operation time such as snow falling time), the other end side of the rotation shaft 34 in the axial direction is flexed by a meshing reaction force between the worm wheel 45 and the worm 35, so that the second ball bearing 37 and the second bearing attaching portion 43*b* are caused to contact with each other. Therefore, a slight movement of the rotation shaft 34 in the diametrical direction is allowed by providing the clearance CL in this manner. Incidentally, the clearance CL is provided with a function of absorbing a dimension error of a constituent part.

When a load applied to the brushless wiper motor 20 for ordinary operation is small, the rotation shaft 34 is rotatably supported by the first ball bearing 36. That is, when the ordinary operation is performed by the brushless wiper motor 20, only the first ball bearing 36 supports the rotation shaft 34 and makes smooth rotation of the rotation shaft possible. On the other hand, a load applied to the brushless wiper motor 20 is large, the second ball bearing 37 supports the rotation shaft 34 in a diametrical direction. Therefore, the second ball bearing 37 can accomplish a function sufficiently even if it is smaller in size than the first ball bearing 36.

A first sensor magnet (sensor member) MG1 used to detect a rotation state (rotation direction, the number of revolution, or the like) of the rotation shaft 34 is provided between the worm 35 and the first ball bearing 36 arranged along the axial direction of the large diameter portion 34a, that is, between the first ball bearing 36 and the second ball bearing 37 of the rotation shaft 34. The first sensor magnet MG1 is formed into an annular shape, and rotated together with the rotation shaft 34. The first sensor magnet MG1 is configured such that its polarities (not shown) appear alternately in its circumferential direction.

Figure 5:
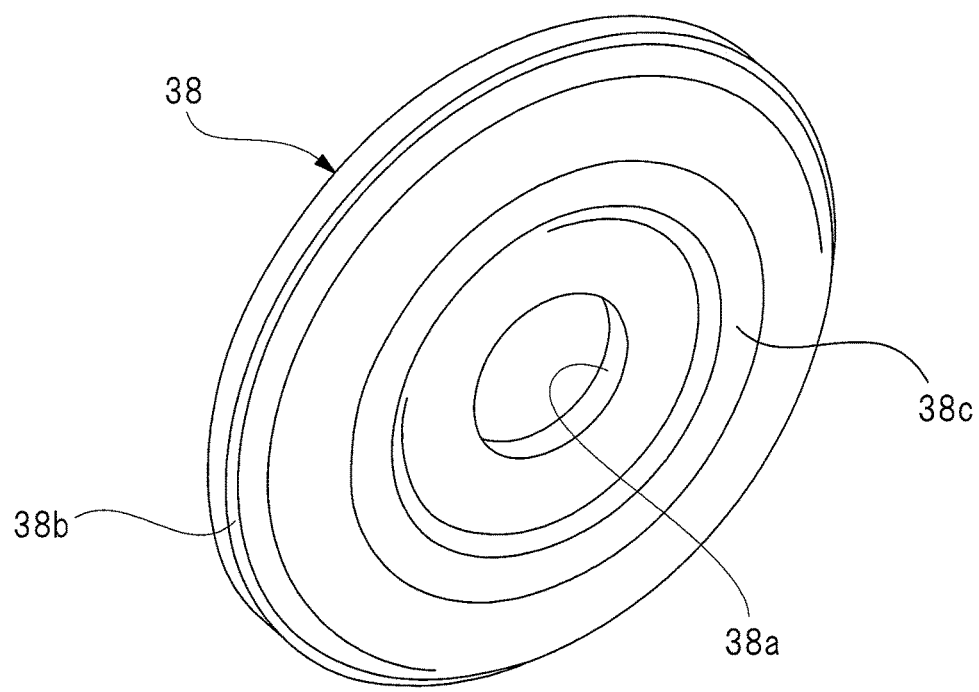
FIG. 5A is a perspective view of a stopper spring.
FIG. 5B is a sectional view of the stopper spring.
Figure 5:
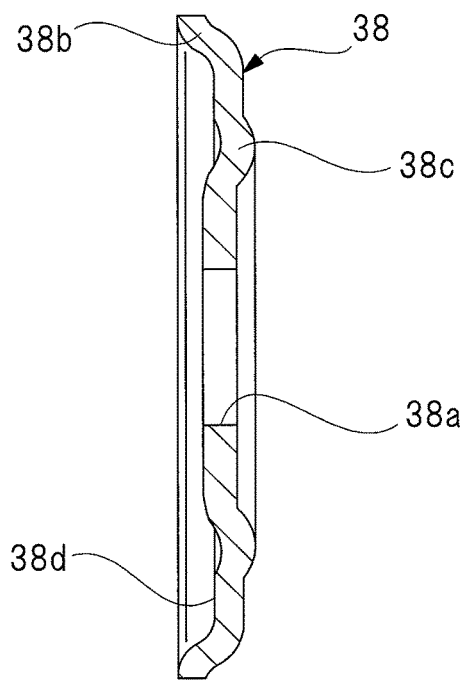

The stopper spring 38 fixed to the spring receiving portion 43h of the gear case 41 by press-fitting is formed into an approximately circular plate by applying pressing or the like to a steel plate, as shown in FIG. 5. A through-hole 38 penetrated by the large diameter portion 34a of the rotation shaft 34 is provided at a central portion of the stopper spring 38. Incidentally, the stopper spring 38 is assembled between the rotor 33 and the first ball bearing 36 at the time of assembling a rotor unit RU shown in FIG. 4.

An elastically deformable portion 38b is integrally provided in a region of the stopper spring 38 outside in a diametrical direction of the stopper spring 38. The elastically deformable portion 38b is provided over a whole circumference of the stopper spring 38, and is formed to have a section of an approximately "S" shape, as shown in FIG. 5B. An outer diameter of the elastically deformable portion 38b, that is, an outer diameter of the stopper spring 38 is set to be slightly larger than an inner diameter of the spring receiving portion 43h. Therefore, the stopper spring 38 is fixed to the spring receiving portion 43h by press-fitting into the spring receiving portion 43h.

An annular outer wheel holding projection 38c is formed between the through-hole 38a and the stopper spring 38 of the elastically deformable portion 38b. A projecting direction of the outer wheel holding projection 38c corresponds to a direction reverse to a projecting direction of the elastically deformable portion 38b. Specifically, the projecting direction of the outer wheel holding projection 38c corresponds to a direction of the first ball bearing 36, and the projecting direction of the elastically deformable portion 38b corresponds to a direction of the rotor 33.

As shown in FIG. 3, the outer wheel holding projection 38c is configured to abut on the outer wheel 36 of the first ball bearing 36. Therefore, by press-fitting the stopper spring 38 into the spring receiving portion 43h, the first ball bearing 36 is located in the first bearing attaching portion 43d to be firmly fixed thereto.

An annular portion 38d to be pushed is formed between the outer wheel holding projection 38c and the elastically deformable portion 38b of the stopper spring 38. A distal end portion of a pushing portion 81b (see FIG. 10) of an assembling jig 80 is configured to be caused to abut on the portion 38d at the time of assembling the rotor unit RU (see FIG. 4) to the gear case 41. Incidentally, the portion 38d faces in the projecting direction of the elastically-deformable portion 38b.

The gear unit 40 is provided with the gear case (the casing) 41 formed into a bottomed bathtub shape by performing forging or the like to aluminum material. As shown in FIG. 6, the gear case 41 has a bottom portion 42, a side wall portion 43 and an opening portion 44. A boss portion 42a projecting toward an outside (lower side in FIG. 6) of the gear case 41 is integrally provided on the bottom portion 42.

Three attaching legs 43a (only two of which are shown in FIG. 6) projecting on the same side as the boss portion 42a are integrally provided on the side wall portion 43. Rubber bushes RB are respectively attached to these attaching legs 43a. Therefore, with the brushless wiper motor 20 mounted on the vehicle 10 (see FIG. 1), vibrations of the brushless wiper motor 20 are hard to be transmitted to the vehicle 10. Furthermore, on the contrary, vibrations of the vehicle 10 are hard to be transmitted to the brushless wiper motor 20.

A second bearing attaching portion 43b formed into a cylindrical shape is integrally provided on an interior side of the gear case 41 in the side wall portion 43. The second ball bearing 37 is disposed within the second bearing attaching portion 43b via the predetermined clearance CL (see FIG. 3), as described above.

A motor fixing portion 43c in which the motor unit 30 (see FIG. 3) is fixed is integrally provided outside the gear case 41 in the side wall portion 43 and in a region facing the second bearing attaching portion 43b. The motor fixing portion 43c is formed into a bottomed cylindrical shape, and the first bearing attaching portion 43d is integrally provided on the bottom portion side (depth side on a sheet showing FIG. 6) of the motor fixing portion 43c. Furthermore, the through-hole 43e penetrated by the rotation shaft 34 is provided at an axial center of the first bearing attaching portion 43d.

The flange portion 43f on which the flange portion 31c (see FIG. 2) of the motor case 31 is caused to abut is integrally provided on the opening portion side (near side of the sheet showing FIG. 6) opposite to the same side as the first axial attaching portion 43d of the motor fixing portion 43c along the axial direction. Female screw portions 43g screwed by the pair of fixing screws 21 (see FIG. 2) coupling the motor unit 30 and the gear unit 40 with each other are provided in the flange portion 43f.

A relatively large dead space DS is formed between the first bearing attaching portion 43d and the flange portion 43f along the axial direction of the motor fixing portion 43c. The spring receiving portion 43h formed into an approximately cylindrical shape is provided in the dead space DS. An inner diameter of the spring receiving portion 43h is larger in size than an inner diameter of the first bearing attaching portion 43d, and the above-described stopper spring 38 (see FIGS. 5A and 5B) is press-fitted and fixed inside the spring receiving portion 43h. By arranging the stopper spring 38 in the dead space DS outside the gear case 41 instead of the inside of the gear case 41, the gear case 41 can be reduced in size.

As shown in FIGS. 3 and 7, the worm wheel 45 together with the worm 35 is rotatably housed in the gear case 41. The worm wheel 45 is formed of, for example, POM (polyacetal) plastic or the like in an approximately circular shape, and it has an outer peripheral portion formed with gear teeth 45a. The teeth 35a (see FIG. 4) of the worm 35 are caused to mesh with the gear teeth 45a of the worm wheel 45. The worm wheel 45 and the worm 35 form a reduction mechanism SD.

A proximal end side of the output shaft 46 is fixed to an axial center of the worm wheel 45, and the output shaft 46 is rotatably supported by a boss portion 42a of the gear case 41. A distal end side of the output shaft 46 extends outside the gear case 41 and the power transmission mechanism 14 (see FIG. 1) is fixed to a distal end portion of the output shaft 46. Therefore, the rotation speed of the rotation shaft 34 is reduced in speed by the reduction mechanism SD so that an output subjected to a high torque by reduction in speed is transmitted from the output shaft 46 to the power transmission mechanism 14. Therefore, the wiper members 15a and 15b (see FIG. 1) are swung. The reduction mechanism SD transmits rotation of the rotor 33 to the wiper members 15a and 15b via the power transmission mechanism 14.

Here, a second sensor magnet MG2 used to detect position information of the output 46, that is, position information of the respective wiper members 15a and 15b is provided on the opposite side (upper side in FIG. 7) to the output shaft 46 along the axial direction of the worm wheel 45. The second sensor magnet MG2 is fixed to a rotation center of the worm wheel 45 to be rotated together with the worm wheel 45. In the second sensor magnet MG2, polarities (not shown) also appear alternately in the circumferential direction.

Incidentally, the worm wheel unit WU, that is, an assembly composed of the worm wheel 45, the output shaft 46 and the second sensor magnet MG2 is pre-assembled together with the rotor unit RU shown in FIG. 4 in another assembling step during assembling of the brushless wiper motor 20.

As shown in FIGS. 3 and 8, the opening portion 44 (see FIG. 6) of the gear case 41 is sealed by the gear cover (the casing) 60 made of plastic or the like. The gear cover 60 is fixed to the gear case 41 by three fixing screws 61 (see FIG. 2). A control board 70 for controlling rotation of the rotor 33 (the rotation shaft 34) is fixed inside the gear cover 60. The control board 70 is electrically connected to a vehicle-mounted battery (not shown) and a wiper switch via an external connector (not shown) of the vehicle 10 which is connected to a connector connection portion 62 provided to the gear cover 60.

A first rotation detecting sensor (detecting member) 71 used to detect rotation states (rotation direction, the number of revolutions and the like) of the rotation shaft 34 is mounted on the control board 70. Here, as the first rotation detecting sensor 71, a hall sensor (hall IC) for detecting magnetic field or the like is used. The first rotation detecting sensor 71 is opposed to the first magnetic sensor MG1 fixed to the rotation shaft 34. Therefore, pulse signals are outputted from the first rotation detecting sensor 71 according to rotation of the first sensor magnet MG1.

A CPU (not shown) mounted on the control board 70 monitors pulse signals from the first rotation detecting sensor 71. Therefore, the CPU grasps the operation state (rotation direction, the number of revolutions and the like) of the rotation shaft 34 to rotationally drive the brushless wiper motor 20.

Furthermore, a second rotation detecting sensor 72 used to detect position information of the output shaft 46 is mounted on the control board 70. Here, as the second rotation detecting sensor 72, an MR sensor using a magnetoresistance effective element (MR element) or the like is used. The second rotation detecting sensor 72 is opposed to the second sensor magnet MG2 (see FIG. 7) fixed to the worm wheel 45. Therefore, a voltage signal varying continuously (linearly) is outputted from the second rotation detecting sensor 72 according to rotation of the second sensor magnet BG2.

The CPU mounted on the control board 70 monitors a voltage signal from the second rotation detecting sensor 72. Therefore, the CPU grasps position information of the respective wiper blades 17a and 17b to rotationally drive the brushless wiper motor 20.

Here, as shown in FIG. 3, a partition plate 73 made of plastic is provided between the control board 70 and the reduction mechanism SD. The partition plate 73 prevents grease applied to the reduction mechanism SD from scattering toward the control board 70.

Next, an assembling procedure of the brushless wiper motor 20 constructed as mentioned above will be described in detail with reference to the drawings.

Figure 9:
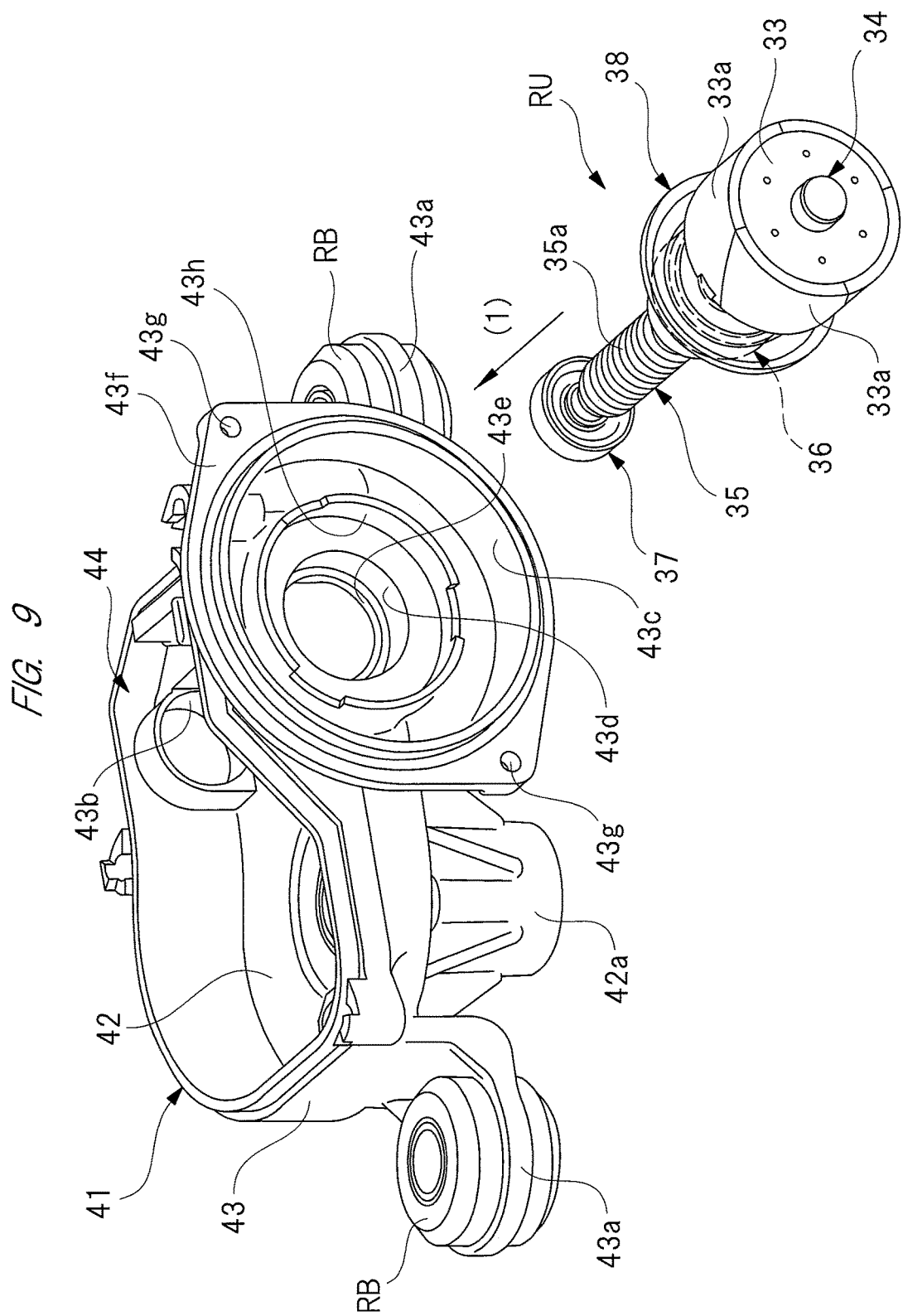
FIG. 9 is a perspective view explaining an assembling step (first step) of a rotor unit.
Figure 10:
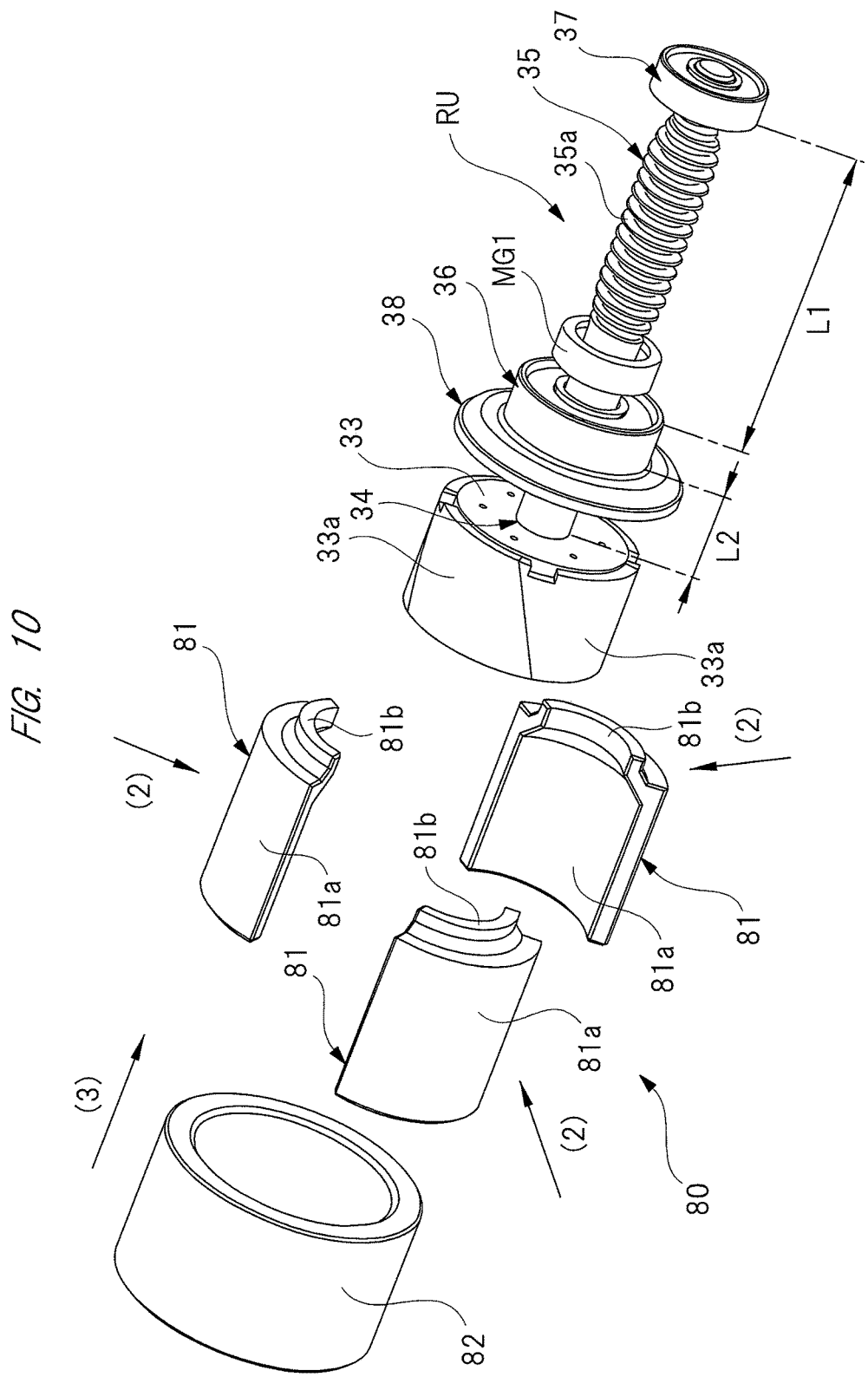
FIG. 10 is a perspective view explaining a jig for pushing the stopper spring.
Figure 11:
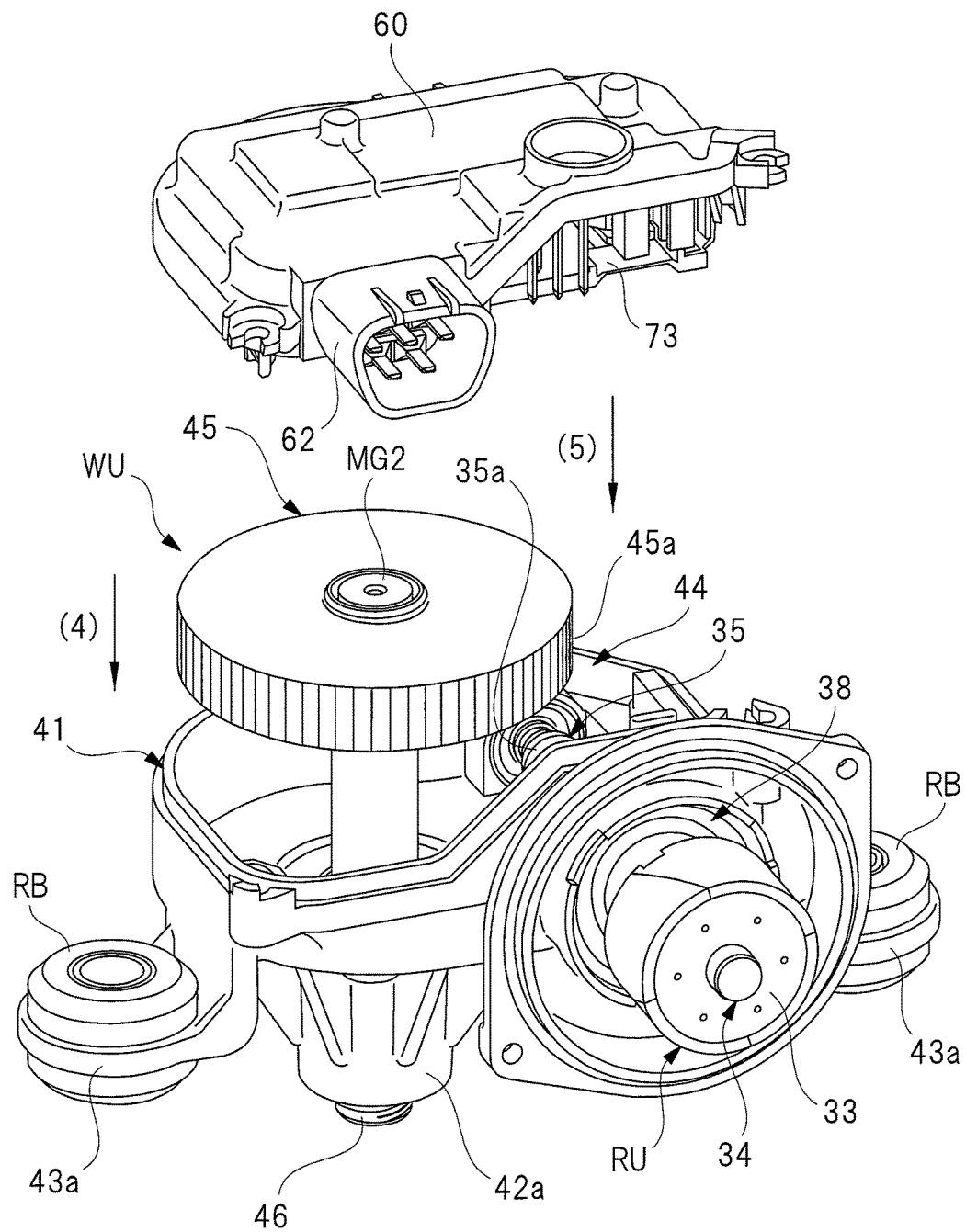
FIG. 11 is a perspective view explaining an assembling step (second step) of the worm wheel unit and an assembling step (third step) of the gear cover.

FIG. 9 is a perspective view explaining an assembling step (first step) of a rotor unit, FIG. 10 is a perspective view explaining a jig for pushing the stopper spring, and FIG. 11 is a perspective view explaining an assembling step (second step) of the worm wheel unit and an assembling step (third step) of the gear cover.

Here, when the rotor unit RU is assembled to the gear case 41, an assembling jig 80 such as shown in FIG. 10 is used. The structure of the assembling jig 80 will be explained below in detail prior to explanation of the assembling steps of the brushless wiper motor 20.

The assembling jig 80 is used when the stopper spring 38 of the rotor unit RU is press-fitted into the spring receiving portion 43h (see FIG. 6) of the gear case 41. The assembling jig 80 is provided with three covering members 81 covering peripheries of the four permanent magnets 33a forming part of the rotor 33. Furthermore, the assembling jig 80 is provided with a retaining cylinder 82 retaining these covering members 81 gathered together in one piece.

The covering member 81 is formed so as to have a transverse section of an approximately arc shape, and provided with a covering main body 81a covering the peripheries of the permanent magnet 33a. Furthermore, a pushing portion 81b formed so as to have a transverse section of an approximately arc shape and having a radius of curvature smaller than that of the covering main body 81a is provided on one end side (the right side in FIG. 10) of the covering main body 81a in a longitudinal direction thereof. Here, an inner diameter of the covering main body 81a is approximately equal to an outer diameter of the permanent magnet 33a. On the other hand, a diameter of the pushing portion 81b is approximately equal to a diameter of the portion 38d (see FIGS. 5A and 5B) of the stopper ring 38. Therefore, a distal end portion of the pushing portion 81b is caused to surface-contact with the portion 38d.

[First Step]

First of all, as shown in FIG. 9, the gear case 41 casted and formed in another manufacturing step is prepared, and the rotor unit RU assembled in another assembling step is prepared. A portion of the rotor unit RU, which is on the same side as the second ball bearing 37, is caused to face the opening portion side of the motor fixing portion 43c of the gear case 41. Then, as shown by an arrow (1) in FIG. 9, the rotor unit RU is moved so as to come close to the motor fixing portion 43c. Therefore, the second ball bearing 37 passes through the through-hole 43e of the first earing attaching portion 43d. Then, when the rotor unit RU is further plugged into the through-hole 43e, the first ball bearing 36 is gradually attached to the first bearing attaching portion 43d while the worm 35 is passing through the through-hole 43e.

Then, as shown by an arrow (2) in FIG. 10, three covering members 81 are arranged around the respective permanent magnets 33a of the rotor 33. Therefore, the respective permanent magnets 33a of the rotor 33 are covered with the respective covering members 81. Then, as shown by an arrow (3) in FIG. 10, the retaining cylinder 82 is attached to outer peripheral portions of the respective covering members 81 with the respective permanent magnets 33a covered with the respective covering members 81. Therefore, the respective covering members 81 are gathered together in a one piece and the distal end portion of the pushing member 81b is opposed to the portion (see FIGS. 5A and 5B) of the stopper spring 38.

By pushing the assembling jig 80 in a direction of the arrow (1) in FIG. 9 with a predetermined pressure, press-fitting into the spring receiving portion 43h of the gear case 41 is performed while the elastically deformable portion 38b (see FIG. 5) of the stopper spring 38 is elastically deformed inside in a diametrical direction. At this time, as shown in FIG. 3, the second ball bearing 37 is disposed in the second bearing attaching portion 43b via a predetermined clearance CL. Here, since the clearance CL is provided between the second ball bearing 37 and the second bearing attaching portion 43b, an aligning work of the rotor unit RU to the gear case 41, that is, a centering work can be performed easily.

After press-fitting of the stopper spring 38 into the spring receiving portion 43h, the assembling jig 80 is disassembled, and removed from the rotor unit RU. Specifically, the retaining cylinder 82 is removed from the respective covering members 81. Then, the covering members 81 made separable are removed from the rotor unit RU.

[Second Step]

Next, as shown in FIG. 11, the worm wheel unit WU assembled in another assembling step is prepared. The distal end side of the output shaft 46 of the worm wheel unit WU is plugged into the boss portion 42a from the opening portion 44 of the gear case 41, as shown by an arrow (4) in FIG. 11. Therefore, the worm wheel unit WU is housed in the gear case 41. At this time, the worm wheel unit WU is swung in forward and reverse directions about the output shaft 46, so that the gear teeth 45a of the worm wheel 45 and the teeth portion 35a of the worm 35 are caused to mesh with each other.

[Third Step]

Next, the gear cover 60 assembled with the control board 70 (see FIG. 8) and the partition wall 73 in another assembling step is prepared. As shown by an arrow (5) in FIG. 11, the partition wall 73 of the gear cover 60 is caused to face the opening portion 44 of the gear case 41 and the gear cover 60 is moved to come close to the gear case 41. At this time, the connector connection portion 62 of the gear cover 60 is set to face the rotor 33 of the rotor unit RU. Thus, the fixing screws 61 (see FIG. 2) are screwed by a fastening tool (not shown) such as a screw driver to fix the gear cover 60 to the gear case 41. Therefore, the gear cover 60 is fixed to the gear case 41, so that assembling of the brushless wiper motor 20 is completed.

As described in detail, in the brushless wiper motor 20 according to the present embodiment, the rotor 33 is rotatably provided inside the stator 32 provided with the coil 32b, one end side of the rotation shaft 34 in the axial direction is fixed to the axial center of the rotor 33, the worm 35 is provided on the other end side of the rotation shaft 34 in the axial direction, the first and second ball bearings 36 and 37 are provided on respective end sides in the axial direction of the rotation shaft 34 than the worm 35, and the rotation shaft 34 is rotatably supported by only the first and second ball bearings 36 and 37.

Therefore, since it is unnecessary to provide a coil, a commutator, etc. to a non-supported free end portion of the rotation shaft 34, and the rotation shaft 34 is shortened as compared with the conventional rotation shaft, an inertial mass of the free end portion of the rotation shaft 34 can be made small. Therefore, the rotation shaft 34 can be operated stably in an energy-saving fashion as compared with the convention operation, and improvement of silence can be achieved. Furthermore, since a commutator or a brush is not provided, electric noises is suppressed, so that while an adverse effect to control devices is excluded, brush replacement is made unnecessary, which can result in maintenance free.

Next, the second embodiment of the present invention will be described in detail with reference to the drawings, detail description about portions the same in function as those of the first embodiment is omitted, and those are denoted by the same reference characters as those of the first embodiment.

Figure 12:
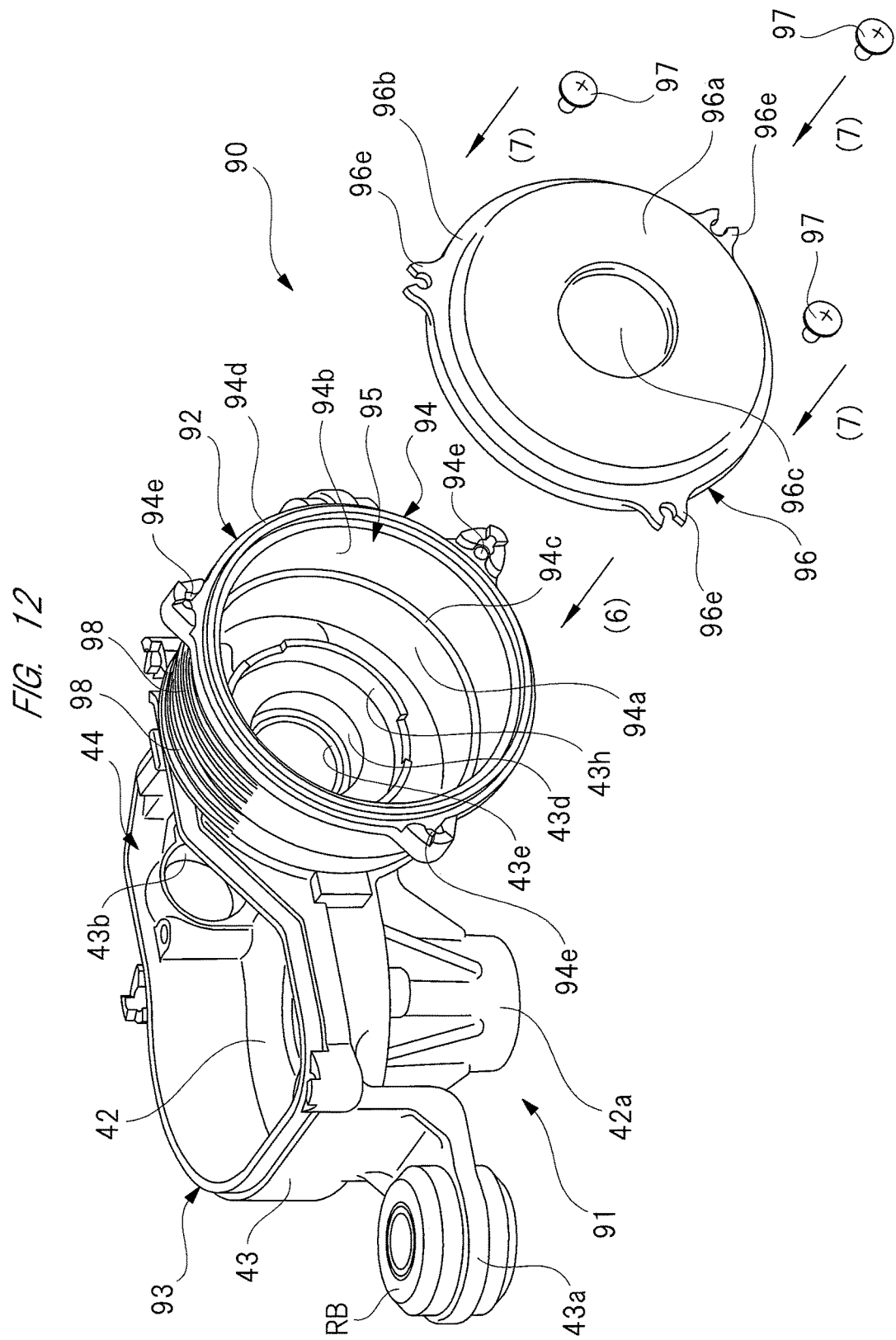
FIG. 12 is a perspective view explaining a casing and a cover member of a brushless wiper motor according to a second embodiment.

FIG. 12 is a perspective view explaining a casing and a cover member of a brushless wiper motor according to a second embodiment.

In the above-described first embodiment, as shown in FIG. 3, the motor unit 30 and the gear unit 40 are constituted as discrete members, and the motor case 31 and the gear case 41 are respectively coupled to each other. On the other hand, in a brushless wiper motor 90 according to the second embodiment, as shown in FIG. 12, a casing 91 having a motor case portion 92 and a gear case portion 93 integrated with each other is adopted.

Specifically, the casing 91 is formed into a predetermined shape by casting aluminum material or the like, and the gear case portion 93 is formed into a shape approximately similar to that of the gear case 41 (see FIG. 6) of the first embodiment. Therefore, detailed explanation of the gear case 93 is omitted.

On the other hand, the motor case portion 92 is provided with a cylindrical main body portion 94 having a small diameter portion 94a and a large diameter portion 94b. The rotor unit RU shown in FIG. 4 is rotatably housed inside the cylindrical main body portion 94, and a size of the cylindrical main body portion 94 along the direction of the rotation shaft 34 (see FIG. 3) is set to be approximately equal to a size of the motor case 31 (see FIG. 3) of the first embodiment along the axial direction of the rotation shaft 34. Therefore, the brushless wiper motor 90 according to the second embodiment is prevented from being made large in size as compared with that of the first embodiment.

The small diameter portion 94a is arranged on the same side as the spring receiving portion 43h along the axial direction of the cylindrical main body 94, and the large diameter portion 94b is arranged on the same side as the opening portion 95 along the axial direction of the cylindrical main body 94. A step portion 94c is provided between the small diameter portion 94a and the large diameter portion 94b inside in a diametrical direction of the cylindrical main body 94. Furthermore, a cover-attaching flange portion 94d which bulges outside in a diametrical direction of the cylindrical main body 94 and to which the cover member 96 is attached is provided on the same side as the opening portion 95 of the large diameter portion 94b.

The other end side (the right side in FIG. 3) of the stator 32 in the axial direction is caused to abut on the step portion 94c. That is, the step portion 94c performs positioning of the stator 32 relative to the axial direction of the cylindrical main body 94. Furthermore, three female screw portions 94e are formed around the cover-attaching flange portion 94d so as to project outside in a diametrical direction of the cover-attaching flange portion 94d. These female screw portions 94e are arranged at equal intervals (at intervals of 120°) along the circumferential direction of the cover-attaching flange portion 94d, and the fixing screws 97 are respectively connected to the female screw portions 94e in a screwing fashion.

A plurality of uneven cooling fins 98 are integrally provided outside in a diametrical direction of the cylindrical main body 94. The cooling fins 98 are used for increasing an outer surface area of the cylindrical main body 94, causing many regions of the outside of the cylindrical main body 94 to contact with external air, and improving heat dissipation of the cylindrical main body 94. The cooling fins 98 are arranged so as to be placed side by side in the axial direction of the cylindrical main body 94, and they are provided so as to extend in the circumferential direction of the cylindrical main body 94.

Here, the cooling fins 98 are arranged on two portions (only one portion is shown in FIG. 12), that is, on the same side as the output shaft 46 (lower side in FIG. 12) and on the same side as the gear cover 60 (upper side in FIG. 12) of the cylindrical main body 94 along the circumferential direction of the cylindrical main body 94. That is, the cooling fins 98 are provided to part of the cylindrical main body 94. Therefore, sufficient heat dissipation and sufficient strength of the motor case portion 92 are secured. However, cooling fins may be provided over the whole circumference of the cylindrical main body 94 according to the specification (rated output or the like) of the brushless wiper motor. By providing the cooling fins so as to extend over the whole circumference of the cylindrical main body 94, it is possible to achieve improvement of fluidity of aluminum material melted at a casting time, and improvement of productivity. Furthermore, as compared with the case that the cooling fins are provided partially, cooling performance of the motor case portion 92 can be improved and rain water can be made easy to flow when the rain water is attached to the cylindrical main body 94.

A cover member 96 is attached to the opening portion 95 of the cylindrical main body 94. The cover member 96 is formed of plastic or the like in an approximately circular plate shape, and provided with a bottom wall portion 96a and an annular attaching portion 96b. A recessed portion 96c recessed on the same side as the cylindrical main body 94 is provided at a central portion of the bottom wall portion 96a. The recessed portion 96c is provided with a function of enhancing the rigidity of the cover member 96, and a function of suppressing resonance of the bottom wall portion 96a during operation of the brushless wiper motor 90 to prevent abnormal noises.

An annular stator abutting portion (not shown) is provided inside the annular attaching portion 96b in the diametrical direction thereof, and the stator abutting portion abuts on one end side (see FIG. 3) of the stator 32 in the axial direction thereof. That is, the cover member 96 together with the step portion 94c performs positioning of the stator 32 with respect to the cylindrical main body 94 in the axial direction thereof at the time of assembling the stator 32 to the cylindrical main body 94. Incidentally, since such a large load as to move the stator 32 in the axial direction is not applied to the stator 32, the cover member 96 is not detached from the cylindrical main body 94.

Three screw fixing portions 96e are formed outside the annular attaching portion 96b in the diametrical direction thereof so as to project outside of the annular attaching portion 96b in the diametrical direction. These screw attaching portions 96e are arranged at equal intervals (120°) along the circumferential direction of the annular attaching portion 96b, and fixing screws 97 are respectively inserted into the screw attaching portions 96e. The fixing screws 97 are used for fixing the cover member 96 to the cylindrical main body 94, and they are joined to respective female screw portions 94e in a screwing fashion.

In the brushless wiper motor 90 according to the second embodiment configured above, operation and effects similar to those of the above first embodiment can be achieved. In addition, in the second embodiment, since the motor case portion 92 and the gear case portion 93 are integrated with each other and the casing 91 is made of aluminum material, heat generated by the stator 32 can be dissipated outside efficiently. Furthermore, since the cooling fins 98 are provided, heat dissipation can be further improved. Therefore, the brushless wiper motor 90 with enhanced heat resistance strength can be realized as compared with the first embodiment.

Furthermore, since the motor case portion 92 and the gear case portion 93 are integrally formed by casing or the like, it is unnecessary to manufacture the motor case portion 92 and the gear case portion 93 individually. In addition, pressing for forming the motor case 31 (see FIG. 3) or the like is made unnecessary, which can result in improvement of workability of the casing 91.

Next, the third embodiment of the present invention will be described in detail with reference to the drawings, detail description about portions the same in function as those of the first embodiment is omitted, and those are denoted by the same reference characters as those of the first embodiment.

Figure 13:
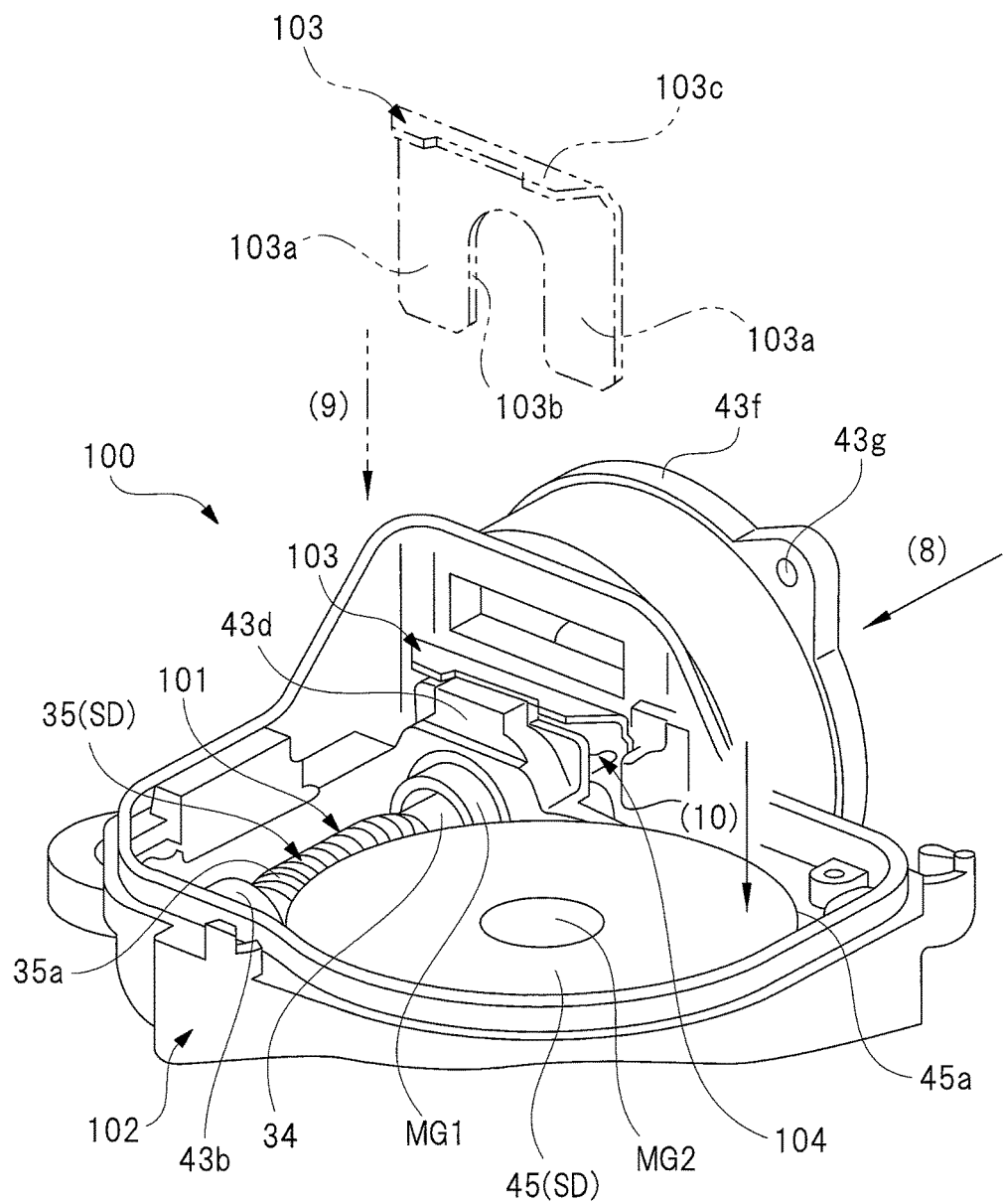
FIG. 13 is an explanatory view of a brushless wiper motor of a third embodiment corresponding to FIG. 9.
Figure 14:
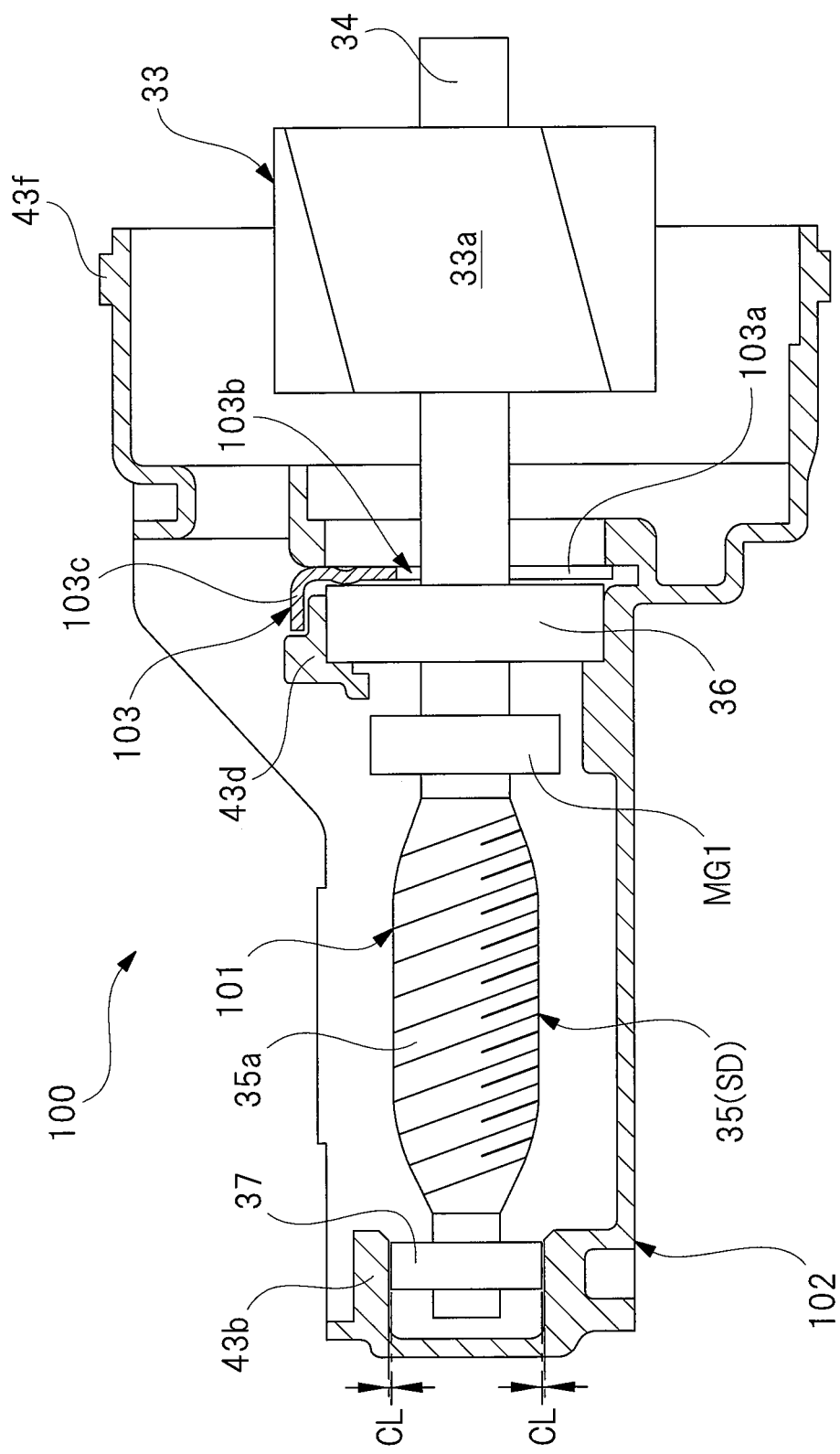
FIG. 14 is a partial sectional view of the brushless wiper motor of FIG. 13, taken along an axial direction of a rotation shaft.

FIG. 13 is an explanatory view of a brushless wiper motor of a third embodiment corresponding to FIG. 9, and FIG. 14 is a partial sectional view of the brushless wiper motor of FIG. 13, taken along an axial direction of a rotation shaft.

As shown in FIGS. 13 and 14, a brushless wiper motor 100 according to the third embodiment is different from that of the first embodiment in structure of a rotor unit 101 and assembling procedure of the rotor unit 101 to a gear case (casing) 102. More specifically, in the first embodiment, as shown in FIG. 9, the rotor unit RU is fixed to the gear case 41 by integrally providing the annular stopper spring 38 and the rotor unit RU with each other in advance, and press-fitting the stopper spring 38 into the spring receiving portion 43h while attaching the first ball bearing 36 to the first bearing attaching portion 43d.

On the other hand, in the third embodiment, as shown in FIGS. 13 and 14, by using a stopper member 103 separated from the rotor unit 101, the first ball bearing 36 is fixed to the first bearing attaching portion 43d. Here, the stopper member 103 is fixed to a stopper member attaching portion 104 provided in the vicinity of the first bearing attaching portion 43d of the gear case 102 by press-fitting. In addition, the first bearing attaching portion 43d and the stopper member attaching portion 104, and the stopper member 103 press-fitted into the stopper member attaching portion 104 constitute a retaining structure in the present invention.

The stopper member 103 is formed into an approximately U-shape by pressing a steel plate or the like. The stopper member 103 has a pair of bearing pushing portions 103a which is plugged into the stopper member attaching portion 104. A notched portion 103b for avoiding interference with the rotation shaft 34 is provided between the pair of bearing pushing portions 103a. Furthermore, the stopper member 103 is provided with a jig pad portion 103c pushed down by a pushing jig (not shown) when the bearing pushing portions 103a are respectively plugged into the stopper member attaching portion 104. An extending direction of the jig pad portion 103c is directed in a direction approximately perpendicular to an extending direction of the respective bearing pushing portions 103a.

In order to assemble the rotor unit 101 to the gear case 102, first, as shown by an arrow (8) in FIG. 13, the worm 35 of the rotor unit 101 is caused to face the flange portion 43f of the gear case 102, and the worm 35 is inserted into the first bearing attaching portion 43d. Then, while the first sensor magnet MG1 is being inserted into the first bearing attaching portion 43d, the outer wheel 36a (see FIG. 3) of the first ball bearing 36 is attached to the first bearing attaching portion 43d. Then, as shown by a double dotted line arrow (9) in FIG. 13, the stopper member 103 is caused to face the stopper member attaching portion 104 in a direction crossing the axial direction of the rotation shaft 34. Then, while the pushing jig is being caused to abut on the jig pad portion 103c, the stopper member 103 is pushed toward the stopper member attaching portion 104. In this manner, as shown in FIG. 14, the first ball bearing 36 is clamped between the first bearing attaching portion 43d and the stopper member 103 along the axial direction of the rotation shaft 34, which results in completion of assembling of the rotor unit 101 to the gear case 102.

Next, as shown by an arrow (10) in FIG. 13, the distal end side of the output shaft 46 (see FIG. 7) is plugged into the boss portion 52a (see FIG. 6) from the inside of the gear case 102. At this time, by swinging the worm wheel 45 in forward and reverse directions, the gear teeth 45a are caused to mesh with the teeth portion 35a. Therefore, the worm wheel 45 is housed in a normal position in the gear case 102. The reduction mechanism SD composed of the worm 35 and the worm wheel 45 is housed in the gear case 102 in this manner.

In the third embodiment formed in the above manner, operation and effects similar to those of the first embodiment can be achieved. In addition, in the third embodiment, since the stopper member 103 is attached to the stopper member attaching portion 104 in the direction crossing the axial direction of the rotation shaft 34, even if a large axial force is applied to the rotation shaft 34 during operation of the reduction mechanism SD, movement of the rotation shaft 34 in the axial direction thereof or wobbling thereof is securely prevented. However, the retaining structure of the third embodiment can be also applied to the brushless wiper motor 90 (see FIG. 12) of the second embodiment.

Next, the fourth embodiment of the present invention will be described in detail with reference to the drawings, detail description about portions the same in function as those of the third embodiment is omitted, and those are denoted by the same reference characters as those of the third embodiment.

Figure 15:
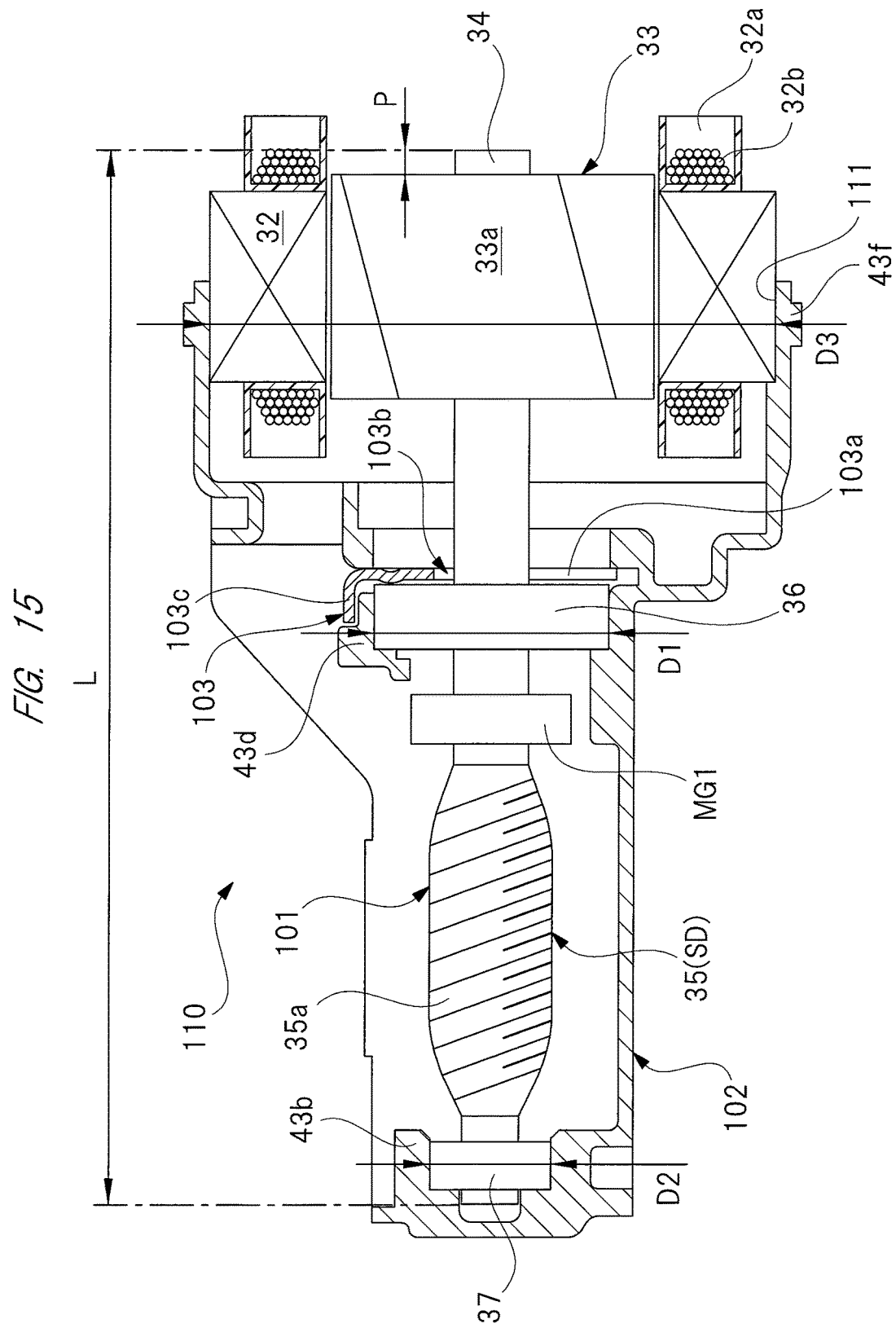
FIG. 15 is an explanatory view of a brushless wiper motor of a fourth embodiment corresponding to FIG. 14.

FIG. 15 is an explanatory view of a brushless wiper motor of a fourth embodiment corresponding to FIG. 14.

As shown in FIG. 15, a brushless wiper motor 110 according to the fourth embodiment is different from that of the third embodiment in that the second ball bearing 37 attached to the rotation shaft 34 is press-fitted into and fixed to the second bearing attaching portion 43b of the gear case 102, and a portion of the stator 32 in the axial direction is press-fitted into and fixed to inside of a portion of the gear case 102 provided with the flange portion 43f in the diametrical direction.

In the brushless wiper motor 110, the second bearing attaching portion 43b is coaxially arranged with the first bearing attaching portion 43d, and the second ball bearing 37 is not wobbled within the second bearing attaching portion 43b. Therefore, even if an axial deviation occurs in the teeth portion 35a during operation of the brushless wiper motor 110, the rotation shaft 34 can be rotated smoothly, which can result in realization of further noise reduction of the brushless wiper motor 110.

Furthermore, the brushless wiper motor 110 is a brushless motor of an inner rotor type, and it does not have a brush and a commutator as well as a coil around the rotor 33. Therefore, the first ball bearing 36 can be fixed to an approximately central portion of the rotation shaft 34 along the axial direction, while shortening the axial length L of the rotation shaft 34. Therefore, it is unnecessary to provide a bearing on the same side as the rotor 33 along the axial direction of the rotation shaft 34. Therefore, the rotation shaft 34 of the brushless wiper motor 110 has a cantilever structure. Incidentally, such a cantilever structure is also similar to those of the above first to third embodiments.

Here, for fixing a rotor to a rotation shaft, a fixing method of partially forming a projecting member (knurl) projected outside in a diametrical direction on an outer periphery of the rotation shaft at a predetermined region along the axial direction of the rotation shaft and press-fitting the rotor to the projecting member is adopted in order to shorten a press-fitting length of the rotor to the rotation shaft. On the other hand, in the brushless wiper motor 110, since a bearing is not provided on the same side as the rotor 33 of the rotation shaft 34, a projecting amount "P" of the rotation shaft 34 from the rotor 33 is reduced due to a bearing which is not provided. Therefore, since a press-fitting length of the rotor 33 to the rotation shaft 34 is short, fixation can be achieved by simply press-fitting the rotor 33 to the rotation shaft 34. Therefore, a step of working the projecting portion can be omitted and a coaxial degree of the rotor 33 to the rotation shaft 34 can be improved.

A stator fixing portion 111 is provided inside a portion of the gear case 102 having the flange portion 43f in a diametrical direction. An approximately half portion of the state 32 along the axial direction thereof is fixed to the stator fixing portion 111 by press-fitting. Incidentally, a diameter D1 of the first ball bearing 36 is set to be 1.5 times or more as large as a diameter D2 of the second ball bearing 37 (D1>1.5×D2). A diameter D3 of the stator 32 is set to be two times or more as large as the diameter D1 of the first ball bearing 36 (D3>2×D1). The stator 32, the first ball bearing 36 and the second ball bearing 37 are arranged coaxially with one another.

Here, at the time of cutting the inside of the gear case 102, the second bearing attaching portion 43b, the first bearing attaching portion 43d, and the stator fixing portion 111 are formed with high precision, and coaxial with one another. Specifically, with the gear case 102 chucked to a chuck apparatus (not shown), each of the second bearing attaching portion 43b, the first bearing attaching portion 43d, and the stator fixing portion 111 are sequentially formed by drilling. Therefore, the second bearing attaching portion 43b, the first bearing attaching portion 43d and the stator fixing portion 111 are arranged coaxially with one another with high precision. Therefore, the coaxial degree of the rotor 33 and the stator 32 is secured with high precision, and it is possible to reduce a clearance between an outer circumference of the rotor 33 and an inner circumference of the stator 32 without being caused to contact with each other, and to realize a brushless wiper motor 110 having high efficiency.

However, the first ball bearing 36 may be fixed to the first bearing attaching portion 43d by press-fitting, and in this case, the coaxial degree between the rotation shaft 34 (the rotor 33) and the stator 32 is further improved. Furthermore, if the coaxial degree among the second bearing attaching portion 43b, the first bearing attaching portion 43d and the stator fixing portion 111 is obtained sufficiently, engagement of spigot joint may be adopted so as to prevent mutual rotation among the second bearing attaching portion 43b, the first bearing attaching portion 43d and the stator fixing portion 111 without press-fitting the stator 32 to the stator fixing portion 111. In this case, it is possible to suppress occurrence of cutting debris (iron powder) during press-fitting.

In the fourth embodiment formed in the above manner, in addition to the various operations and effects described above, an operation and an effect similar to those of the third embodiment can be achieved.

It goes without saying that the present invention is not limited to the above embodiments, and it can be modified variously without departing from the scope of the present invention. In the first to third embodiments, examples in which the clearance CL allowing movement of the rotation shaft 34 in the diametrical direction is provided between the second ball bearing 37 and the second bearing attaching portion 43b are described. The present invention is not limited to this example, and a clearance CL allowing movement of the rotation shaft 34 in the axial direction may be provided between the second ball bearing 37 and the rotation shaft 34. In this case, prior to assembling the rotor unit RU and 101 to the gear case 41 and 102, the second ball bearing 37 is assembled into the second bearing attaching portion 43b in advance.

Furthermore, in the above-mentioned embodiments, the second ball bearing 37 is adopted as the second bearing are described, but the present invention is not limited to this example and the so-called metal bearing which is not provided with an outer wheel, an inner wheel and steel balls can be adopted as the second bearing. In this case, a parts cost can be suppressed and the whole brushless wiper motor can be reduced in weight.

Furthermore, in the above-mentioned embodiments, the wiper apparatus 12 is provided with the power transmission mechanism 14, but the present invention is not limited to this, and it may be made unnecessary to have the power transmission mechanism 14 in the course of transmission of the swinging motion of the brushless wiper motor 20, 90, 100, or 110 to the respective pivot shafts 13a and 13b. In this case, brushless wiper motors corresponding to the respective pivot shafts 13a and 13b are provided in order to transmit power to the respective pivot shafts 13a and 13b.

Furthermore, in the second embodiment, the cover member 96 is formed of plastic or the like has been shown, but the present invention is not limited to this example, the cover member may be formed of another material such as, for example, iron, aluminum, or synthetic resin, and a material thereof is not limited. Furthermore, three screw fixing portions 96e are shown as a configuration for fixing the cover member 96 to the cylindrical main body 94, but the present invention is not limited to this, and the number of screw fixing portions 96e is not limited. In addition, the three screw fixing portions 96e are shown as a configuration for fixing the cover member 96 to the cylindrical main body 94, but the present invention is not limited to this, and it is not limited to the structure in which fixing is performed by screws because it is possible to adopt a structure where the cover member 96 is fixed to the cylindrical main body 94 by one-touch operation utilizing engagement of engaging claws, a structure where fixation is performed by screw-joining the cover member itself to the opening portion, a structure where fixing is performed by light press-fitting, or the like. Furthermore, it is only required that air tightness between the cover member and the cylindrical main body is maintained.

Furthermore, in the above embodiments, the brushless wiper motor 20, 90, 100, or 110 is applied as a driving source of the wiper apparatus 12 wiping the front windshield 11 of the vehicle 10, but the present invention is not limited to this example, and it can also be applied to a driving source of a rear wiper apparatus of a vehicle, or a driving source of a wiper apparatus of a railway vehicle, a ship, a construction machine or the like.

The brushless wiper motor is used as a driving source of a wiper apparatus mounted on a vehicle such as automotive vehicle, and it is used to drive a wiper arm in a swinging manner to wipe rain water or the like attached to a windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A brushless wiper motor, the brushless wiper motor including a motor unit and a gear unit, the motor unit having a stator, a rotor inside the stator, and a rotation shaft whose one end side in an axial direction is fixed to an axial center of the rotor, the gear unit having a gear case connected to the motor unit and housing the other end side of the rotation shaft in the axial direction, and a gear cover sealing an opening of the gear case, the wiper apparatus comprising:
   a first bearing fixed onto the rotation shaft to a first side of a worm provided on the other end side of the rotation shaft in the axial direction;
   a first bearing attaching portion provided in the gear case and fixing the first bearing;
   a second bearing fixed onto the rotation shaft at a second side of the worm so as to be opposed to the first bearing;
   a second bearing attaching portion provided in the gear case and fixing the second bearing;
   a stopper member fixing the first bearing to the first bearing attaching portion from a side of the motor unit; and
   a stopper member attaching portion provided in the gear case and fixing the stopper member by press-fitting from a direction crossing the axial direction of the rotation shaft,
   wherein the first bearing is clamped between the first bearing attaching portion and the stopper member fixed to the stopper member attaching portion.

2. The brushless wiper motor according to claim 1, wherein
   the stopper member is formed into an approximately U-shape by pressing a steel plate, and
   the stopper member is provided with a pair of bearing pushing portions to be plugged into the stopper member attaching portion.

3. The brushless wiper motor according to claim 1, further comprising:
   a first sensor magnet provided on the rotation shaft between the worm and the first bearing; and
   a first rotation detecting sensor mounted on a control board fixed to the gear cover so as to control rotation of the rotation shaft, the first rotation detecting sensor being opposed to the first sensor magnet and outputting a signal according to rotation of the first sensor magnet to detect a rotation state of the rotation shaft.

4. The brushless wiper motor according to claim 1, further comprising:
- a worm wheel housed in the gear case, meshing with the worm, and forming a reduction mechanism along with the worm;
- a second sensor magnet provided to an axial center of the worm wheel; and
- a second rotation detecting sensor mounted on a control board fixed to the gear cover so as to control rotation of the rotation shaft, the second rotation detecting sensor being opposed to the second sensor magnet and outputting a signal according to rotation of the second sensor magnet to detect position information of an output shaft fixed onto an axial center of the worm wheel.

5. The brushless wiper motor according to claim 1, wherein a diameter of the second bearing is smaller than a diameter of the first bearing.

\* \* \* \* \*